United States Patent [19]
Maekawa

[11] Patent Number: 5,942,876
[45] Date of Patent: Aug. 24, 1999

[54] INVERTER CONTROLLER

[75] Inventor: Katsumi Maekawa, Saitama-ken, Japan

[73] Assignee: Kabushiki Kaisha Toshiba, Kawasaki, Japan

[21] Appl. No.: 08/989,854

[22] Filed: Dec. 12, 1997

[30] Foreign Application Priority Data

Dec. 13, 1996 [JP] Japan ..................................... 8-333278

[51] Int. Cl.⁶ ................. H02P 7/63; H02M 7/48
[52] U.S. Cl. .................. 318/801; 318/778; 318/809; 318/811
[58] Field of Search ..................... 318/778, 779, 318/798–801, 807, 809, 810, 811

[56] References Cited

U.S. PATENT DOCUMENTS

| | | | |
|---|---|---|---|
| 4,641,075 | 2/1987 | Asano et al. ............................. | 318/811 |
| 5,038,092 | 8/1991 | Asano et al. ............................. | 318/811 |
| 5,537,308 | 7/1996 | Gritter ....................................... | 363/95 |

FOREIGN PATENT DOCUMENTS 1-259761  10/1989  Japan .

OTHER PUBLICATIONS

S. Ogasawara, et al., "Current–Controlled PWM Inverters Having High Speed Current Response and Low Harmonic Currents", The Transactions of The Institute of Electrical Engineers of Japan, vol. 106–B, No. 2, Feb. 1986, pp. 9–16.

*Primary Examiner*—Bentsu Ro
*Attorney, Agent, or Firm*—Oblon, Spivak, McClelland, Maier & Neustadt, P.C.

[57] ABSTRACT

The inverter controller includes a deviation arithmetic circuit which calculates the deviation between the current command (reference) and the output current, a vector angle arithmetic circuit which calculates the deviation current vector angle on the basis of the deviation calculated by this deviation arithmetic circuit, and a switching sequence logic circuit which selects the switching signal on the basis of the deviation current vector angle calculated by the vector angle arithmetic circuit and its own switching signal being output or on the basis of the deviation current vector angle and its own switching signal and the switching signal output previously, and obtains an output current by controlling self-turn-off switching devices on the basis of the switching signal output by the switching sequence logic circuit.

8 Claims, 28 Drawing Sheets

INVERTER CONTROLLER

BACKGROUND TO THE INVENTION

1. Field of the Invention

The present invention relates to an inverter controller which controls inverters having self-turn-off switching devices.

2. Description of the Related Art

The performance of speed controllers for alternating-current motors depends largely on their current control efficiency. For high performance, the output current of the inverter must respond rapidly to the value of the current command sent from the external speed control system, torque control system, or other device.

In pulse width modulation (PWM) inverters, such rapid current response can be obtained using a PWM control method using the current hysteresis band. The control configuration in such a case is shown in FIG. 1.

In FIG. 1, 1 is a direct current power supply, 2 is a capacitor, and 3 is an inverter consisting of self-turn-off switching devices SUP, SVP, SWP, SUN, SVN, and SWN and respective diodes DUP, DVP, DWP, DUN, DVN, and DWN, to which they are connected in inverse parallel. 4 is an alternating-current motor. 5U, 5V, and 5W are Hall CTs. 6 is a current detector. 7U, 7V, and 7W are subtracters which output the respective deviations Δiu, Δiv, and Δiw on receiving respective phase current command values iu*, iv*, and iw* which should flow through the alternating-current motor and the alternating-current motor phase current detection values iu, iv, and iw output from the current detector. 8U, 8V, and 8W are hysteresis comparators which, on receiving current deviations Δiu, Δiv, and Δiw, change their output to logical value 1 if the deviation exceeds the set hysteresis width (hys/2) and change their output to logical value 0 if the deviation is less than (−hys/2). The outputs of hysteresis comparators 8U, 8V, and 8W are PWM signals Uo, Vo, and Wo of each of the phases of inverter 3 and are output to logic circuit 9. PWM signals Uo, Vo, and Wo are input into logic circuit 9, which then performs the prescribed on-delay-time processing of these signals and of their logical inverse signals then outputs drive signals to the six self-turn-off switching devices which make up inverter 3. The output from logic circuit 9 is sent via gate circuit 10 to the gates of the self-turn-off switching devices corresponding to inverter 3.

The operation of this type of circuit can be explained simply with reference to FIG. 2. Either side of the sine-wave current command value iu*, shown as a chain line, are the two hys/2 hysteresis widths, shown as dotted lines. If current iu changes to the positive direction and reaches the current command value (iu*+hys/2), the hysteresis comparator output becomes logical value 0 and the inverter negative-side switch comes on, causing negative voltage −Ed/2 to be applied to the motor coil and current iu to change to the negative direction, where Ed is the voltage of direct-current power supply 1. If, in changing to the negative direction, current iu reaches the current command value (iu*−hys/2), the positive-side switch comes on, causing positive voltage +Ed/2 to be applied to the motor coil and current iu to change to the positive direction. In this way, current iu can be controlled so that it is maintained within hysteresis width ±hys/2 of current reference iu*. Since the comparator gain may be considered almost infinite, very rapid current control response is possible. However, by the same token, a hysteresis width to limit the switching frequency is required. The highest switching frequency is determined by the leakage impedance of the coil, the direct current voltage of the inverter, the switching speed and other characteristics of the arc-self-suppressing switching elements, and the hysteresis width.

The above explanation is valid if one phase only is considered, and it is not possible to obtain an ideal PWM waveform as shown in FIG. 2 in an alternating-current motor drive using a three-phase inverter.

FIG. 3 shows some examples of waveforms when hysteresis-band PWM control is used in an alternating-current motor drive using a three-phase inverter. The waveforms of currents iu, iv, and iw are shown with their hysteresis bands along with the waveforms of motor phase voltages Vu, Vv, and Vw and the line voltage Vu−v. It is clear from the figure that the switching frequency changes. The switching frequency is low during period T1 and high during period T2. This kind of phenomenon occurs at low rotation speeds and when the current command value is small.

The low switching frequency during T1 is due to the fact that, since the voltage is +Ed/2 in all three phases, and all of the line voltages are 0, there is a period during which the current changes as a result of back electromotive force only, and since the rotation speed is low and therefore the back electromotive force is small, the current changes gradually. Furthermore, since the voltages of the three phases have the same potential and the magnitude of the vector resulting from the combination of these voltages such that all line voltages become zero is zero, the vector is hereinafter called the zero-voltage vector.

Conversely, the high switching frequency during T2 is due to the fact that the current changes rapidly, since at no time are the voltages of the three phases equal, and any two of motor line voltages Vu−v, Vv−w, and Vw−u are not zero. The ratio of the current ripple to the switching frequency during T2 is much higher than during T1. Voltage vectors which are not zero-voltage vectors are hereinafter called nonzero-voltage vectors.

High switching frequencies, as during T2, are more likely when the current reference (which is also called the current command in some cases hereinafter) is small, while low switching frequencies, as during T1, are more likely at low motor rotation speeds, when the back electromotive force is small. A low rotation speed combined with a small current reference will cause very large modulation frequency fluctuations.

Despite the advantage of very rapid current control response, hysteresis-band PWM control has recently fallen out of favor for the following main reasons:

(1) The switching frequency varies greatly, as during T1 and T2 in FIG. 3.

(2) During T2 in FIG. 3, at the same switching frequency the current ripple is considerably larger than that in triangle-wave-comparison PWM control and other types of PWM control.

It is difficult to counter ambient noise and radio noise if the modulation frequency varies. Furthermore, because the inverter must be capable of accommodating the highest modulation frequency, fluctuations in modulation frequency mean larger equipment. Widening the hysteresis band to lower the highest modulation frequency increases the magnitude of the current ripple. Hysteresis-band PWM control already has a larger current ripple than triangle-wave-comparison PWM control and other types of PWM control and therefore has the serious drawback of having to provide a large margin in the current ratings of the switching elements. As shown in FIG. 3, the switching frequency varies even though the rotation speed, the amplitude, and the hysteresis band are all fixed.

A method of solving these problems was published in 'A current-control PWM inverter capable of harmonic suppression and rapid current response' by Satoshi Ogasawara, Tomoaki Nishimura, Hirobumi Akamoto, and Akira Nanba (Electrical Society Paper B, February 1986). If the current deviation is large, as in stepped current reference variation, the method uses conventional hysteresis-band PWM control. If the current deviation is small, as in a steady state, the method changes over to switching capable of harmonic suppression.

The steady-state method controls the switching by detecting the angle of the back electromotive force vector of the alternating-current motor and using only the two nonzero-voltage vectors either side of the back electromotive force vector (those with the nearest angles) and the zero-voltage vector. It is believed that harmonic suppression is more effective if voltage vectors with a small current variation ratio are selected. However, as the motor rotation speed increases, the voltage drop due to inductance increases, and, even in a steady state, a voltage vector whose angle differs greatly from that of the back electromotive force vector must be used to obtain the desired current. In the present invention, when the current deviation becomes large, the method changes over to conventional hysteresis-band PWM control.

A method using deviation current differentiation and, for permanent-magnet motors, a method using calculation of the back electromotive force are presented as methods of detecting the back electromotive force vector. However, as described in the above publication, the method using deviation current differentiation is sensitive to noise, while the method of calculating the back electromotive force for permanent-magnet motors assumes a steady state, leaving open the possibility of an error in the transition state. Because this switching method determines the switching signal on the basis of the direction of the back electromotive force vector, erroneous detection of the back electromotive force vector directly results in the output of an incorrect switching signal.

The above method must therefore be used with conventional hysteresis-band PWM control. Even if rapid response is not required, it is not sufficient to use only a switching method capable of harmonic suppression.

All the same, because of the large harmonic waves and the very serious problem of modulation frequency fluctuations, the use of hysteresis-band PWM control has become confined to special applications. Also, in the method based on the detection of the back electromotive force vector, the detection of the back electromotive force itself constitutes a problem. Where the back electromotive force load is unknown, the back electromotive force is estimated using deviation current differentiation, resulting in a system that is vulnerable to noise.

SUMMARY OF THE INVENTION

In consideration of the above problems, the object of the present invention is to provide inverter controllers which enable PWM signals capable of harmonic suppression and of rapid current control response to be obtained without back electromotive force vector position information and which enable PWM signals whose switching frequency does not fluctuate widely to be obtained.

Inverter output voltage vectors can be broadly divided into zero-voltage vectors and nonzero-voltage vectors. Since the current during the outputting of a zero-voltage vector changes in accordance with the back electromotive force only, zero-voltage vectors cannot be used to control the change in direction of the current unless, as in the above method, there is no back electromotive force position information. The change in direction of the current can be controlled using nonzero-voltage vectors only. That is, if the current is controlled using nonzero-voltage vectors only, a large number of harmonic waves are generated, as in conventional hysteresis-band PWM. Therefore, an appropriate balance must be struck between the use of zero-voltage vectors and of nonzero-voltage vectors.

If such current control can be achieved, in current control in a steady state in which the current deviation is sufficiently small, it should be possible to use nonzero-voltage vectors to compensate for current changes due to the back electromotive force during zero-voltage vector output.

In the present invention, current changes during zero-voltage vector output are determined using the current deviation itself. Ideally the changeover to the zero-voltage vector should be made when the current deviation becomes zero, using nonzero-voltage vectors to control the current in such a way as to minimize the current deviation.

Current changes during zero-voltage vector output depend on the back electromotive force, so it is unclear as to how the current vector changes. However, since the changeover to the zero-voltage vector is made when the current deviation becomes zero, the current deviation vector should certainly become larger. Furthermore, the current change during zero-voltage vector output appears as it is in the current deviation vector. Therefore, to minimize the current deviation again, the steady state can be maintained by controlling the current by using nonzero-voltage vectors. Furthermore, the operation of minimizing the current deviation is in fact the normal current control operation. Current control is achieved using the same logic in stepped change of the current reference and other transition states also.

In contrast to conventional current control, where the current is controlled so that the mean value is equal to the current reference, in the method used in the present invention the current is not controlled so that its mean value is equal to the current reference. Only about one-half of the change due to the back electromotive force during zero-voltage vector output is displaced from the reference as the mean value.

In accordance with the above principle, during the changeover from zero voltage to nonzero voltage in a steady state, the current deviation vector can be made to show a change due to the back electromotive force. Subsequently, it is sufficient to select a nonzero-voltage vector to control the current deviation vector so that it becomes zero.

In the present invention, switching is performed between the two nonzero-voltage vectors either side of the current deviation vector. The selection of one of the two nonzero-voltage vectors is explained below. Once control using nonzero-voltage vectors has begun, a logic is established in which the nonzero-voltage vector whose angle is nearest to the current deviation vector angle is selected from two adjacent nonzero-voltage vectors. The current changes in accordance with the selected nonzero-voltage vector and, of course, the current deviation vector also changes. In a steady state, switching is performed automatically in accordance with this a logic between the two nonzero-voltage vectors as the current deviation becomes smaller. Although the change in the current deviation vector in a transition state differs from that in a steady state, with the result that the selected nonzero-voltage vector sometimes moves successively to the adjacent vector, in a steady state the same two nonzero-voltage vectors are selected repeatedly.

In a steady state, switching is controlled by combining two adjacent nonzero-voltage vectors with a zero-voltage vector. As a result, the mean output voltage is included in the region bounded by these two adjacent nonzero-voltage vectors. The combination of a given mean voltage and the voltage vector used to output that voltage is the same as that used in triangle-wave-comparison PWM control, which is now frequently used because of the low occurrence of harmonic waves. In many cases the back electromotive force vector is close to the resultant output mean voltage, and in such cases, control is performed using only voltage vectors which generate the smallest current ripple.

Until the current deviation becomes zero, the current cannot in fact be controlled using nonzero-voltage vectors. Nevertheless, the time at which the current deviation cannot be made any smaller, even by repeated switching using nonzero-voltage vectors, can be determined from the angle difference between the nonzero-voltage vector and the current deviation vector being output, and at this time the operation moves to the zero-voltage vector.

In the present invention, switching control is performed on the basis of the above principle, enabling PWM control with few harmonic waves to be achieved in a steady state and PWM control capable of rapid current control to be achieved in a transition state.

Accordingly, the purpose of the present invention is achieved by providing an inverter controller based on the principle described above.

In the matter of an inverter controller which controls the output current of an inverter having arc-self-extinguishing switching elements so that it obeys current commands, the present invention is an inverter controller which has a deviation arithmetic circuit which calculates the deviation between the current commands and the output current, and which has a vector angle arithmetic circuit which calculates the deviation current vector angle on the basis of the deviation from the deviation arithmetic circuit, and which has a switching sequence logic circuit which generates a switching sequence so that a switching signal is selected on the basis of the deviation current vector angle calculated by the vector angle arithmetic circuit and the switching signal being output by the switching sequence logic circuit itself or on the basis of the deviation current vector angle and the switching signal being output by the switching sequence logic circuit itself and a switching signal output previously, and which has the special feature that it controls the self-turn-off switching devices on the basis of the switching signals output by the switching sequence logic circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
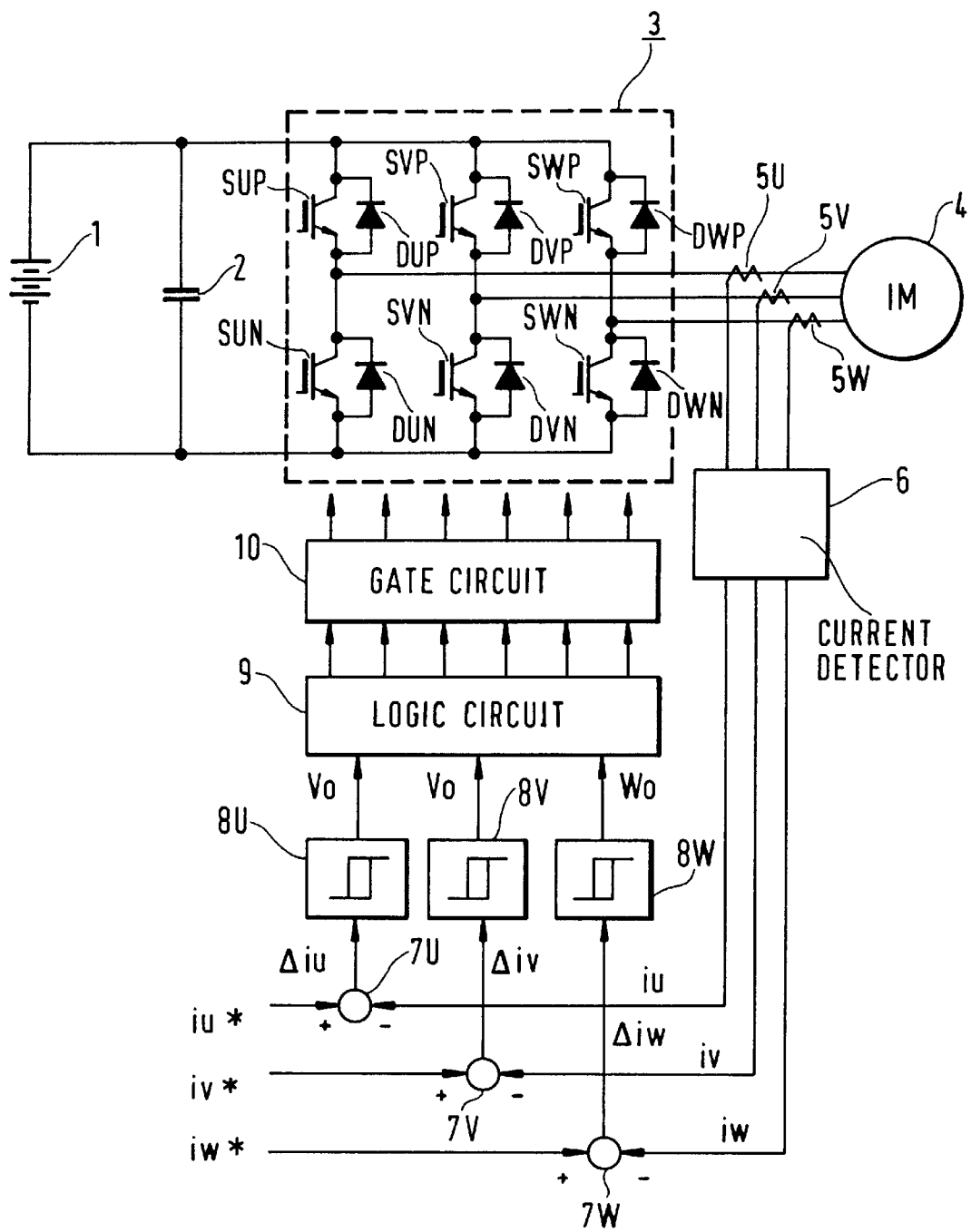
FIG. 1 is a general circuit diagram of a conventional hysteresis-band PWM control circuit.
Figure 2:
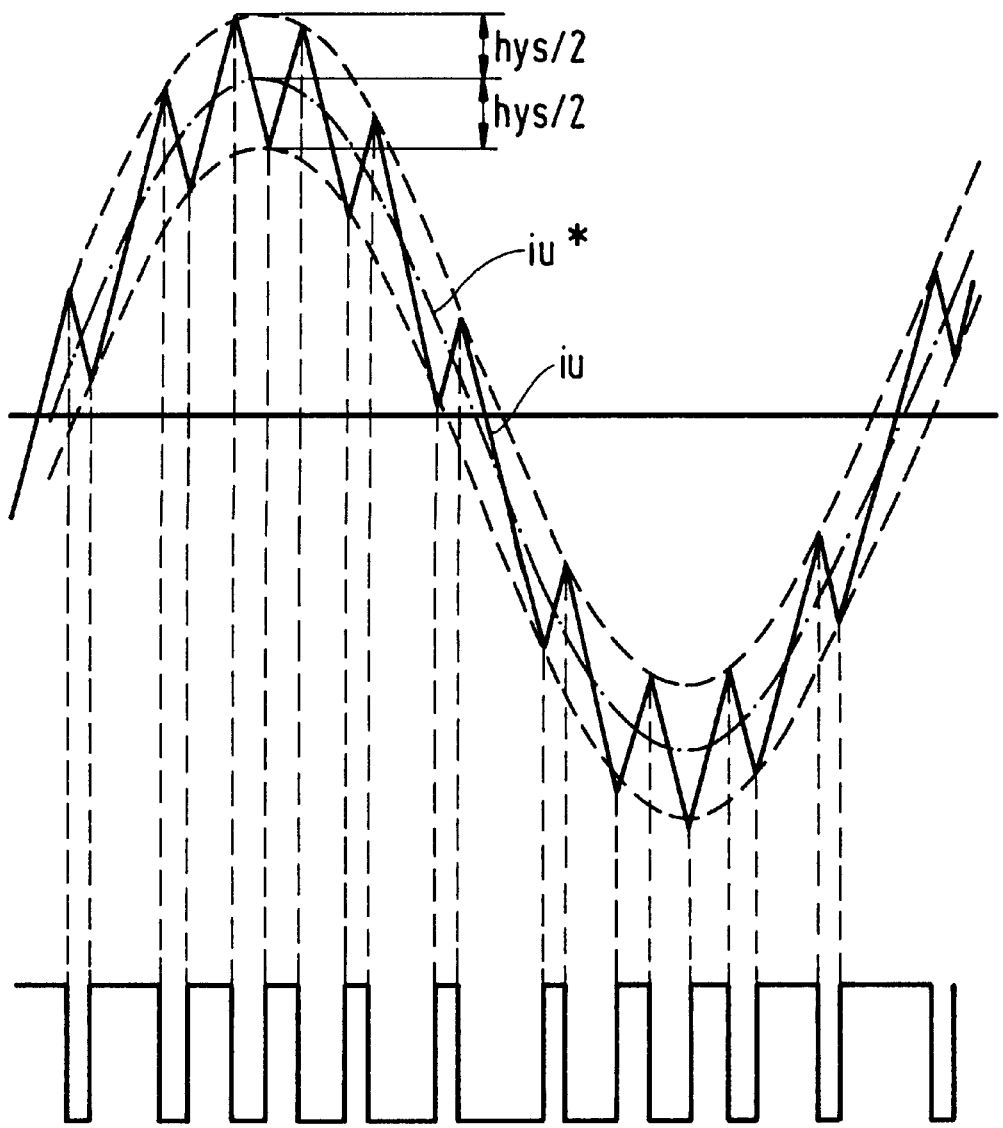
FIG. 2 is a diagram for the hysteresis-band PWM control operation.
Figure 3:
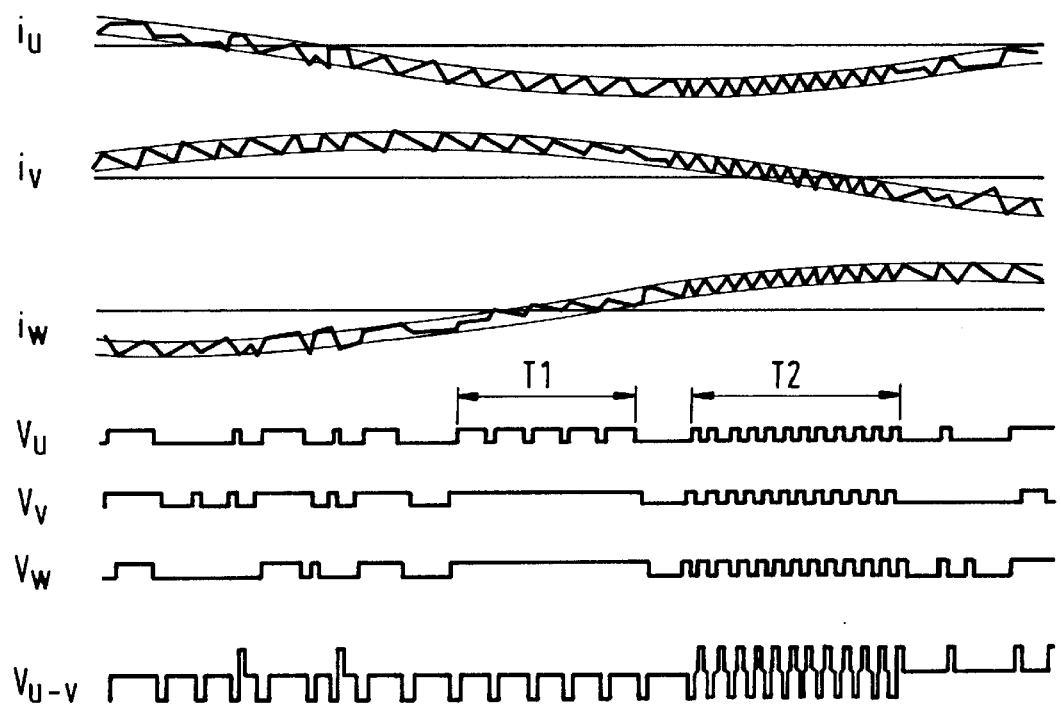
FIG. 3 is a diagram for hysteresis-band PWM control nonconformities.

Referring now to the drawings, wherein like reference numerals designate identical or corresponding parts throughout the several views, and more particularly to FIG. 4 thereof, on embodiment of the present invention will be described.

Figure 4:
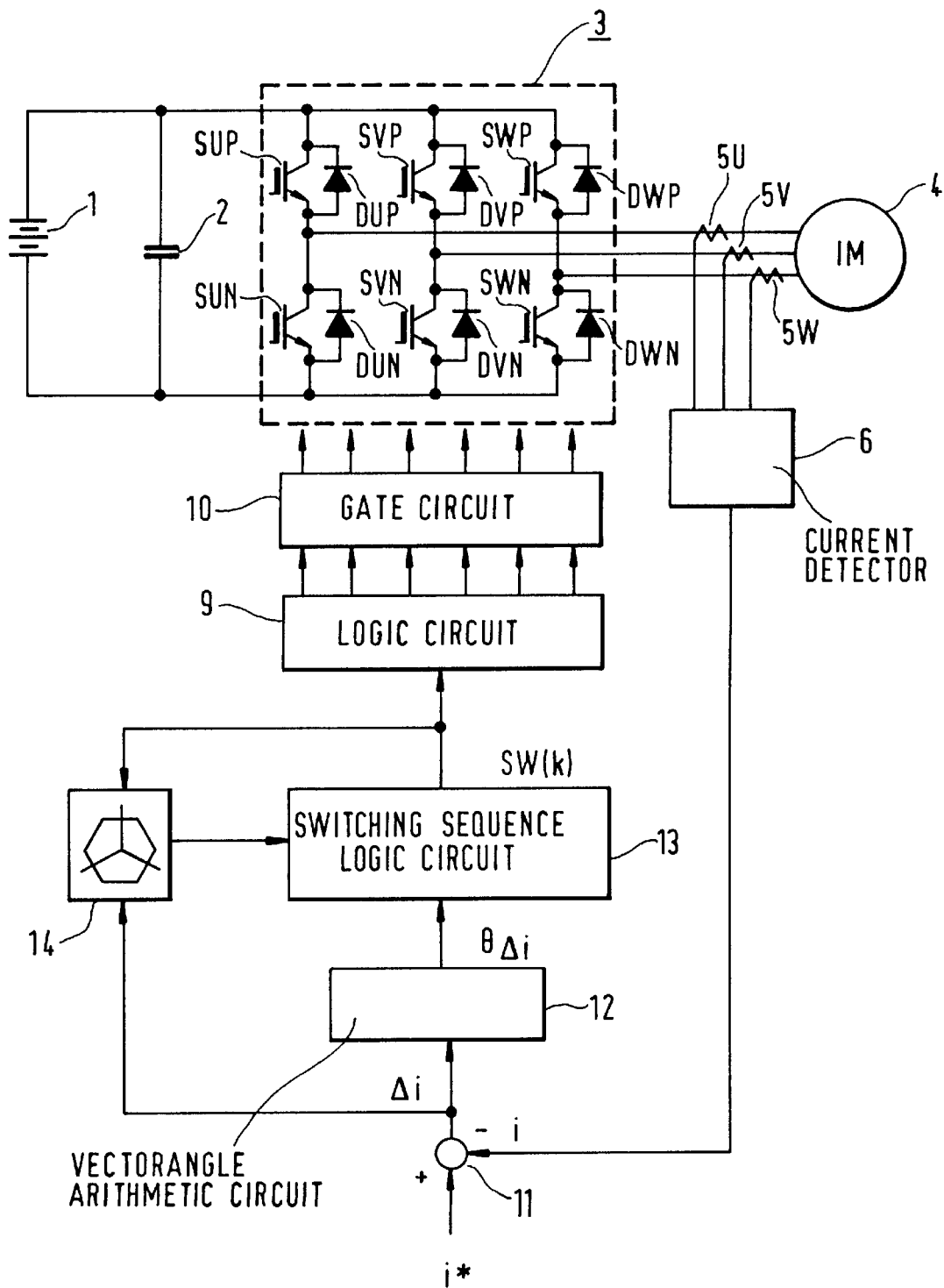
FIG. 4 is an outline configuration diagram showing embodiment 1 of the invention.

FIG. 4 is a block configuration diagram of the inverter controller in embodiment 1 of the present invention. Since 1 to 6, 9, and 10 in the figure have the same structural elements as in FIG. 1, their explanation has been omitted. i*, i, Δi, and sw(k) denote respectively the current reference, the current, the current deviation, and the PWM signal as vectors, although their respective vectors are made up of three-phase vector components.

11 is a vector subtracter which determines deviation vector Δi, which is the difference between current reference vector i* and current detection vector i. The internal configuration of vector subtracter 11 is determined by the assignment of the current reference vector and the current detection vector. If these are assigned the three phase components U, V, and W, as is conventional, subtracters 7U, 7V, and 7W in FIG. 1 may be considered as a single set.

12 is a vector angle arithmetic circuit which calculates angle θΔi of deviation vector Δi. Using three-phase-to-two-phase conversion, vector angle arithmetic circuit 12 converts the deviation vector three-phase UVW coordinate components, Δiu, Δiv, and Δiw, into orthogonal two-phase XY coordinate components Δix and Δiy in accordance with equations (1) and (2) below.

$$\Delta ix = (2\Delta iu - \Delta iv - \Delta iw)/3 \qquad (1)$$

$$\Delta iu = (\Delta iv - \Delta iw)/\sqrt{3} \qquad (2)$$

Moreover, deviation vector angle θΔi is calculated using the relational expression between the orthogonal coordinates and the polar coordinates of the vector and the codes of in accordance with equations (3) and (4) below.

$$|\Delta i| = \sqrt{((\Delta ix)^2 + (\Delta iy)^2)} \qquad (3)$$

$$\cos\theta\Delta i = \Delta ix/|\Delta i| \qquad (4)$$

If the Y axis of the XY coordinates and the U axis of the UVW coordinates are made to coincide, when the deviation vector is pointing in the positive direction of the U axis, θΔi=0.

13 is a switching sequence logic circuit, and 14 is a sequence start circuit. Switching sequence logic circuit 13 operates on the basis of current deviation vector angle Δθ and the sequence start signal output by sequence start circuit 14 and outputs switching command vector swc, which is equal to sw(k). Switching command vector sw(k) is made up of the three phase switching commands swu, swv, and sww, and when expressed in component form, it is written (swu, swv, sww). In other words, sw(k)=(swu, swv, sww).

Switching commands swu, swv, and sww have binary values of 0 or 1. When switching command swu is 1, the command signal is for inverter U-phase positive-side element SUP to be on (negative-side element SUN is off). When swu is 0, the command signal is for inverter U-phase negative-side element SUN to be on (positive-side element SUP is off).

k in switching command vector sw(k) is the decimalized value of the binary number obtained by writing in sequence the unaltered values of the switching commands for each phase of (swu, swv, sww). For example, when (swu, swv, sww) is (1,0,0), the value of each switching signal is written in sequence to form the binary number 100, which is converted into the decimal number 4. Therefore, sw(4)=(1, 0,0) indicates a switching command for only the U-phase positive-side element to be on and for the negative-side elements of other phases to be on. Taking the value of k to be between 0 and 7, switching signal vectors sw(0) to sw(7) are possible. The space vector of the voltage output by the inverter when the on/off state of the inverter element is controlled using switching command sw(k) is expressed as v(k). Voltage vector v(k) when the direct-current voltage of the inverter is Ed has the values shown in table 1. In the case of switching command vectors sw(0) and sw(7), the output voltages of all three phases have the same potential, so the line voltage is zero whichever line is taken. Such voltage vectors are called zero-voltage vectors.

Since the voltage vectors in the case of switching command vectors sw(1) to sw(6) have the same magnitude as the direct-current voltage Ed and have directions spaced at 60-degree intervals, they are called nonzero-voltage vectors.

Figure 5:
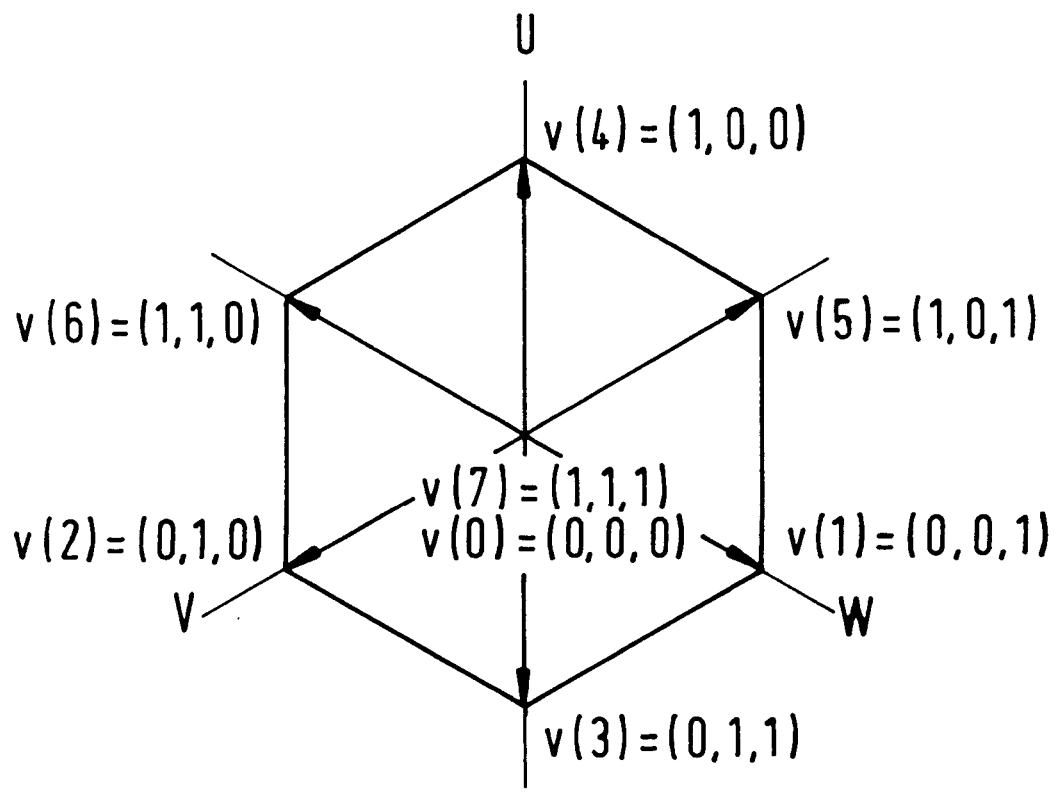
FIG. 5 is a diagram of voltage vectors capable of being output by the voltage inverter in embodiment 1 of the invention.

The voltage vectors are shown in FIG. 5. Since switching command vector sw(k) and voltage vector v(k) have a one-to-one correspondence, switching signals sw(0) and sw(7), which correspond to zero-voltage vectors v(0) and v(7), are called zero vectors, while other switching signals are called nonzero vectors.

TABLE 1

| SWITCHING COMMAND VECTOR | CORRESPONDING VOLTAGE VECTOR | VOLTAGE VECTOR MAGNITUDE | VOLTAGE VECTOR ANGLE |
| --- | --- | --- | --- |
| sw(4) = (1, 0, 0) | v (4) | Ed | 0 |
| sw(6) = (1, 1, 0) | v (6) | Ed | π/3 |
| sw(2) = (0, 1, 0) | v (2) | Ed | 2π/3 |
| sw(3) = (0, 1, 1) | v (3) | Ed | π |
| sw(1) = (0, 0, 1) | v (1) | Ed | 4π/3 |
| sw(5) = (1, 0, 1) | v (5) | Ed | 5π/3 |
| sw(0) = (0, 0, 0) | v (0) | 0 | — |
| sw(7) = (1, 1, 1) | v (7) | 0 | — |

Figure 6:
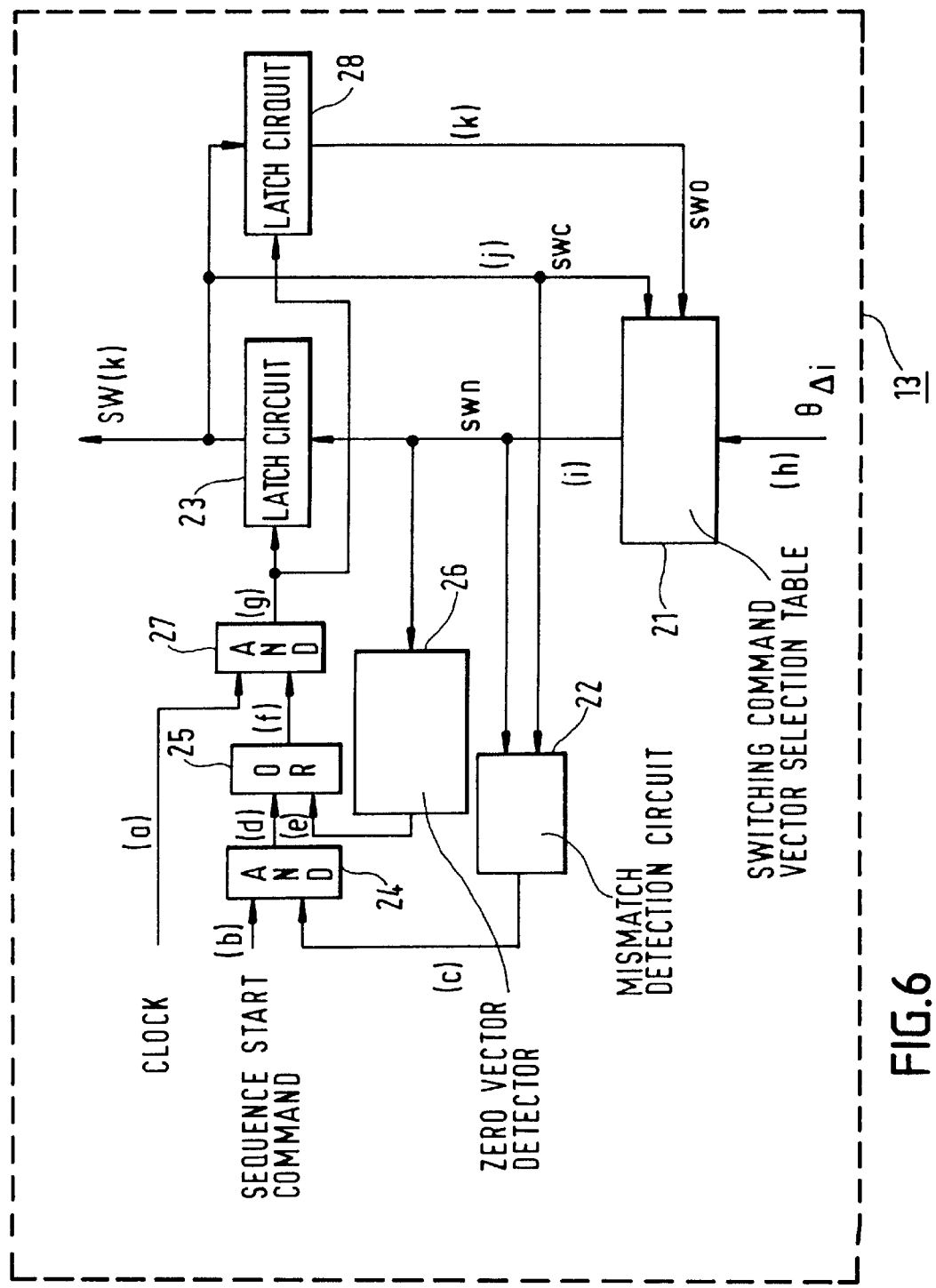
FIG. 6 is a detailed configuration diagram of the switching sequence logic circuit in embodiment 1 of the invention.

Switching sequence logic circuit 13 is shown in detail in FIG. 6. From inputs of current deviation vector angle vector θΔi, switching command vector swc, which is being output as a PWM signal, and switching command vector swo, which was used as a PWM signal before being changed into swc, switching command vector selection table 21 outputs switching signal swn, which should be selected at the next output change. The contents of switching command vector selection table 21 are shown in tables 2 and 3. Table 2 is used when the switching command being output as a PWM signal is a zero vector, while table 3 is used when the switching command being output is a nonzero vector.

TABLE 2

| SWITCHING COMMAND BEING OUTPUT swc | PRECEDING SWITCHING COMMAND swo | CURRENT DEVIATION VECTOR ANGLE θΔi | | | | | |
|---|---|---|---|---|---|---|---|
| | | $-\pi/6$ ~$-\pi/6$ | $\pi/6$ ~$-\pi/2$ | $\pi/2$ ~$5\pi/6$ | $5\pi/6$ ~$7\pi/6$ | $7\pi/6$ ~$9\pi/2$ | $3\pi/2$ ~$11\pi/6$ |
| sw(0) OR sw(7) | ALL OF sw(0) TO sw(7) | sw(4) | sw(4) | sw(2) | sw(3) | sw(1) | sw(5) |

Table 2 shows that if swc, the switching command being output as a PWM signal, is a zero vector, whether it is sw(0) or sw(7), and regardless of what type of vector preceding switching command swo was, switching command swn is selected on the basis of the current deviation vector angle only. If current deviation vector angle θM is between $-\pi/6$ and $\pi/6$, sw(4) will be selected and will be output as swn. As can be seen from table 1, the angle of v(4) is 0, while table 2 presents in a tabular form the logic that when the switching command being output is a zero vector, the switching command that will generate the voltage vector whose angle is nearest to the current deviation angle is selected.

TABLE 3

| SWITCHING COMMAND BEING OUTPUT swc | PRECEDING SWITCHING COMMAND swo | CURRENT DEVIATION VECTOR ANGLE θΔi | | | | | |
|---|---|---|---|---|---|---|---|
| | | $-\pi/6$ ~$-\pi/6$ | $\pi/6$ ~$-\pi/2$ | $\pi/2$ ~$5\pi/6$ | $5\pi/6$ ~$7\pi/6$ | $7\pi/6$ ~$3\pi/2$ | $3\pi/2$ ~$11\pi/6$ |
| sw(4) | sw(5), sw(6), sw(7) | sw(4) | sw(6) | | sw(1) | | sw(5) |
| | OTHER THAN ABOVE | | | | sw(7) | | |
| sw(6) | sw(4), sw(2), sw(9) | | | sw(2) | | sw(7) | |
| | OTHER THAN ABOVE | | | | | sw(6) | |
| sw(2) | sw(6), sw(3), sw(7) | sw(0) | | | sw(3) | | sw(8) |
| | OTHER THAN ABOVE | sw(7) | | | | | sw(7) |
| sw(3) | s(2), sw(1), sw(0) | sw(7) | | | | | |
| | OTHER THAN ABOVE | sw(0) | | | | | sw(0) |
| sw(1) | sw(3), sw(5), sw(7) | sw(0) | | | | | sw(5) |
| | OTHER THAN ABOVE | sw(7) | | | | | |
| sw(5) | sw(1), sw(4), sw(0) | sw(4) | | | sw(7) | | sw(5) |
| | OTHER THAN ABOVE | sw(0) | | | | | |

Meanwhile, if swc, the switching command being output as a PWM signal, is a nonzero vector, then swn, the switching command which should be output by switching command selection table 21, changes in accordance with swc or in accordance with swo, the switching command output the time before.

The following is an explanation of the vector selection logic of table 3.

(1) If the angle difference between the current deviation vector and the nonzero-voltage vector due to swc, the switching command being output as a PWM signal, is less than or equal to ±30 degrees, then a switching signal the same as swc, the switching command being output, will be selected.

(2) If the angle difference between the current deviation vector and the nonzero-voltage vector due to swc, the switching command being output as a PWM signal, is equal to or greater than ±30 degrees and less than or equal to ±60 degrees, then the nonzero-voltage vector whose angle is nearest to that of the current deviation vector will move to the vector next to the nonzero-voltage vector being output. The switching command which generates the nonzero-voltage vector whose angle is nearest to the current deviation vector will be selected.

(3) If the angle difference between the current deviation vector and the nonzero-voltage vector due to swc, the switching command being output as a PWM signal, is equal to or greater than ±90 degrees, then a zero vector will be selected. There are two types of switching command which generate zero-voltage vectors, sw(0) and sw(7), and which of these is selected is determined by swo, the switching command output as a PWM signal the time before.

The contents of tables 2 and 3 are summarized in switching command vector selection table 21.

Mismatch detection circuit 22 compares swn, the output of the switching command vector selection table, with swc, the output of latch circuit 23. If swn matches swc, mismatch detection circuit 22 outputs logical value 0. If swn does not match swc, mismatch detection circuit 22 outputs logical value 1.

AND circuit 24 performs an AND operation on the sequence start command output by sequence start circuit 14 and the mismatch signal output by mismatch detection circuit 22 and outputs the resultant signal. OR circuit 25 performs an OR operation on the output of AND circuit 24 and the output of zero vector detector 26 and outputs the resultant signal.

If swn, the output of switching command vector selection table 21, is either sw(0) or sw(7), zero vector detector 26 outputs logical value 1. If swn is other than sw(0) or sw(7), zero vector detector 26 outputs logical value 0. AND circuit 27 performs an AND operation on the clock signal which determines the control sampling sent by the clock generator (not shown in the diagram) and the signal output by OR circuit 25. The output of AND circuit 27 is sent as a latch timing signal to latch circuits 23 and 28. The data input of latch circuit 23 is swn, the output of switching command vector selection table 21. At the rising of the latch timing signal, latch circuit 23 latches swn and outputs it as swc. The data input of latch circuit 28 is swc, the output of latch circuit 23. Latch circuit 28 latches the data input signal in accordance with the latch timing signal and outputs the resultant signal, swo.

Figure 7:
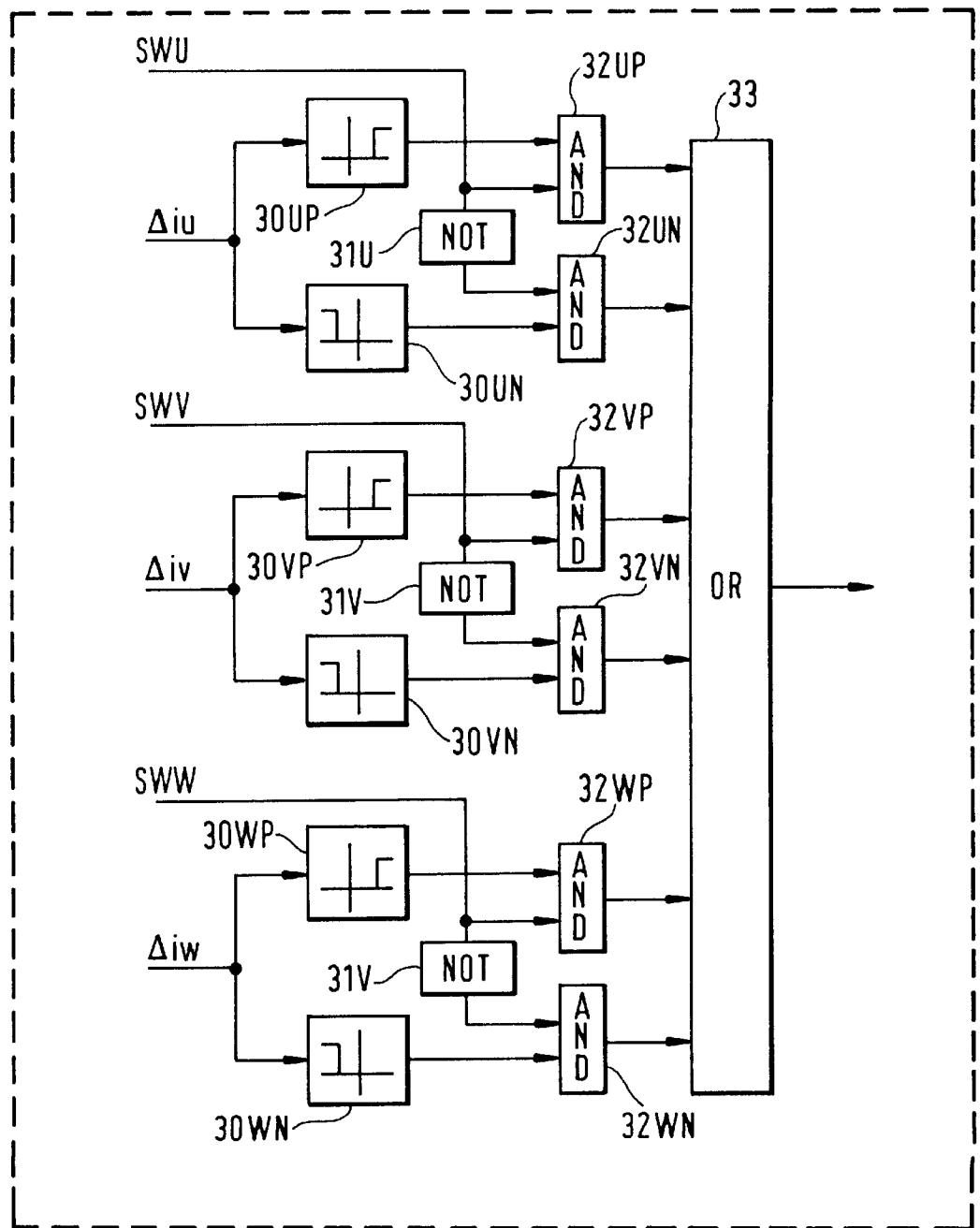
FIG. 7 is a detailed configuration diagram of the sequence start circuit in embodiment 1 of the invention.

An example of a sequence start circuit (14) is shown in FIG. 7. In the figure, 30UP, 30UN, 30VP, 30WP, and 30WN are comparators. Of these, 30UP, 30VP, and 30WP output logical value 1 if the input signal exceeds the positive prescribed value and output logical value 0 if the input signal does not exceed the positive prescribed value.

Comparators 30UN, 30VN, and 30WN output logical value 1 if the input signal is more negative than the negative prescribed value and logical value 0 if the input signal is not more negative than the negative prescribed value. Δiu, the U-phase component of current deviation vector Δi, is sent to comparators 30UP and 30UN; V-phase component Δiv is sent to comparators 30VP and 30VN; and W-phase component Δiw is sent to comparators 30WP and 30WN.

31U, 31V, and 31W are NOT circuits which perform a negative logic operation on their input signals then output the resultant signal. swu, the U-phase component of swc, the switching command output by switching sequence logic circuit 13, is sent to NOT circuit 31U; swv, the V-phase component of swc, is sent to NOT circuit 31V; and sww, the W-phase component of swc, is sent to NOT circuit 31W.

32UP, 32UN, 32VP, 32VN, 32WP, and 32WN are AND circuits. swu, swv, and sww, which are respectively the U-phase, V-phase, and W-phase components of switching command swc, are sent as one input, and the outputs of comparators 30UP, 30VP, and 30WP are sent as the other input respectively to AND circuits 32UP, 32VP, and 32WP, which then perform AND operations and output resultant signals. The outputs of negative logic circuits 31U, 31V, and 31W are sent as one input, and the outputs of comparators 30UN, 30VN, and 30WN are sent as the other input respectively to AND circuits 32UN, 32VN, and 32WN, which then perform AND operations and output resultant signals. OR circuit 33 performs an OR operation on the outputs from all of 32UP, 32UN, 32VP, 32VN, 32WP, and 32WN then outputs the resultant signal as the sequence start signal.

The following is an explanation of the operation of sequence start circuit 14 shown in FIG. 7.

Δiu, the U-phase component of current deviation vector Δi and which is equal to iu*−iu, is sent to comparators 30UP and 30UN. If |Δiu|<H, where H is the magnitude of the comparator comparison level, the outputs of both of comparators 30UP and 30UN will be 0. The outputs of AND circuits 32UP and 32UN also will be 0. If

|Δiv|<H

|Δiw|<H also are established, the outputs of all of AND circuits 32UP, 32UN, 32VP, 32VN, 32WP, and 32WN will be 0, so the output of OR circuit 33 will be 0, irrespective of the value of the switching command.

In other words, if the magnitude of the current deviation is within the error range determined by comparator comparison level magnitude H, the output of sequence start circuit 14 will be 0.

If |Δiu|<H, then the outputs of both of comparators 30UP and 30UN will be 1. In this case, the output of comparator 30UP will be 1 and the output of AND circuit 32UP will be 1 only when swu is 1, and sequence start circuit 14 will output logical value 1. Even if the output of comparator 30UP is 1, if swu is 0, the output of AND circuit 32UP will be 0.

In other words, in phases in which the inverter positive-side element is on, when the phase current is greater than the reference by H or more, sequence start circuit 14 outputs logical value 1. Similarly, in phases in which the negative-side element is on, when the phase current is less than the reference by H or more, sequence start circuit 14 outputs logical value 1. In the case of the U phase, ?>this<? is done by comparator 30UN, negative logic circuit 31U, AND circuit 32UN, and OR circuit 33. The same applies to the V phase and the W phase.

As a result, only when the current error exceeds the prescribed value and the prescribed switch condition has been satisfied, sequence start circuit 14 outputs logical value 1 and starts switching sequence logical circuit 13.

Figure 8:
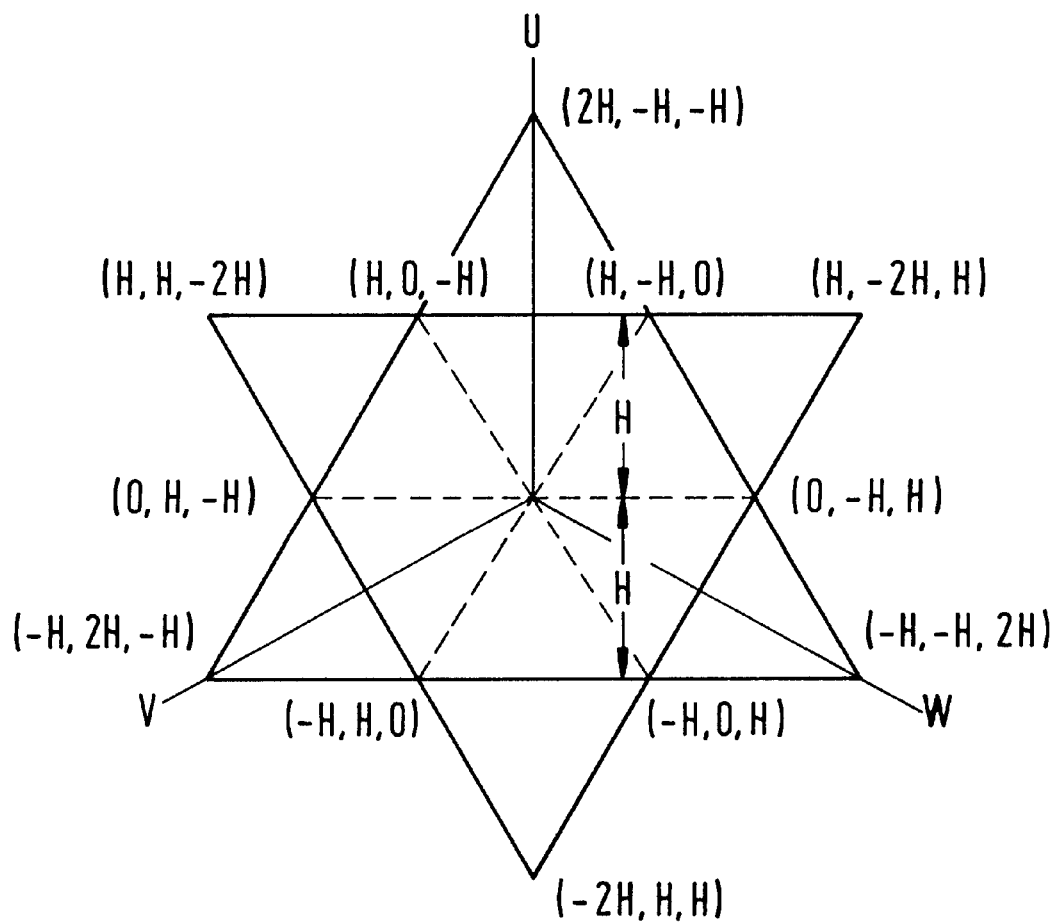
FIG. 8 is a diagram of the allowable error range of the sequence start circuit shown in FIG. 7.

The allowable error range of sequence start circuit 14, shown in FIG. 7, is shown in FIG. 8. FIG. 8 shows two triangles. If the U-axis, V-axis, and W-axis components in a UVW coordinate system are u, v, and w, respectively, and are represented by (u,v,w), using comparator comparison level H, the vertices of the first triangle are denoted by (2H,−H,−H), (−H,2H,−H), and (−H,2H,−H), while those of the second triangle are denoted by (−2H,H,H), (H,−2H,H), and (H,H,−2H).

If the current deviation vector tip is inside the hexagon common to both triangles, the outputs of all of comparators 30UP to 30WN in FIG. 7 will be 0, and therefore the output of OR circuit 33 also will be 0. If the current deviation vector tip is inside only one of the two triangles, that is, in one of the six small triangles outside the hexagon, the output of OR circuit 33 will differ in accordance with the switching condition.

For example, in the small triangle whose vertices are (2H,−H,−H), (H,0,−H), (H,−H,0), since the current deviation U-phase component is greater than H, the output of comparator 30UP is 1. In this case, if switching signal swu is 1, the output of AND circuit 32UP will be 1, while if switching signal swu is 0, the output of AND circuit 32UP will be 0, and the outputs of all other AND circuits also will be 0.

Accordingly, when switching signal swu is 1, the small triangles can be considered to be outside the allowable error range, so sequence start circuit 14 outputs logical value 1. However, when switching signal swu is 0, the small triangles can be considered to be inside the allowable error range, so sequence start circuit 14 outputs logical value 0.

Using the switching signal to change the size of the allowable error range in this way prevents excessive rapid repetitive on/off switching in a given element.

Figure 9:
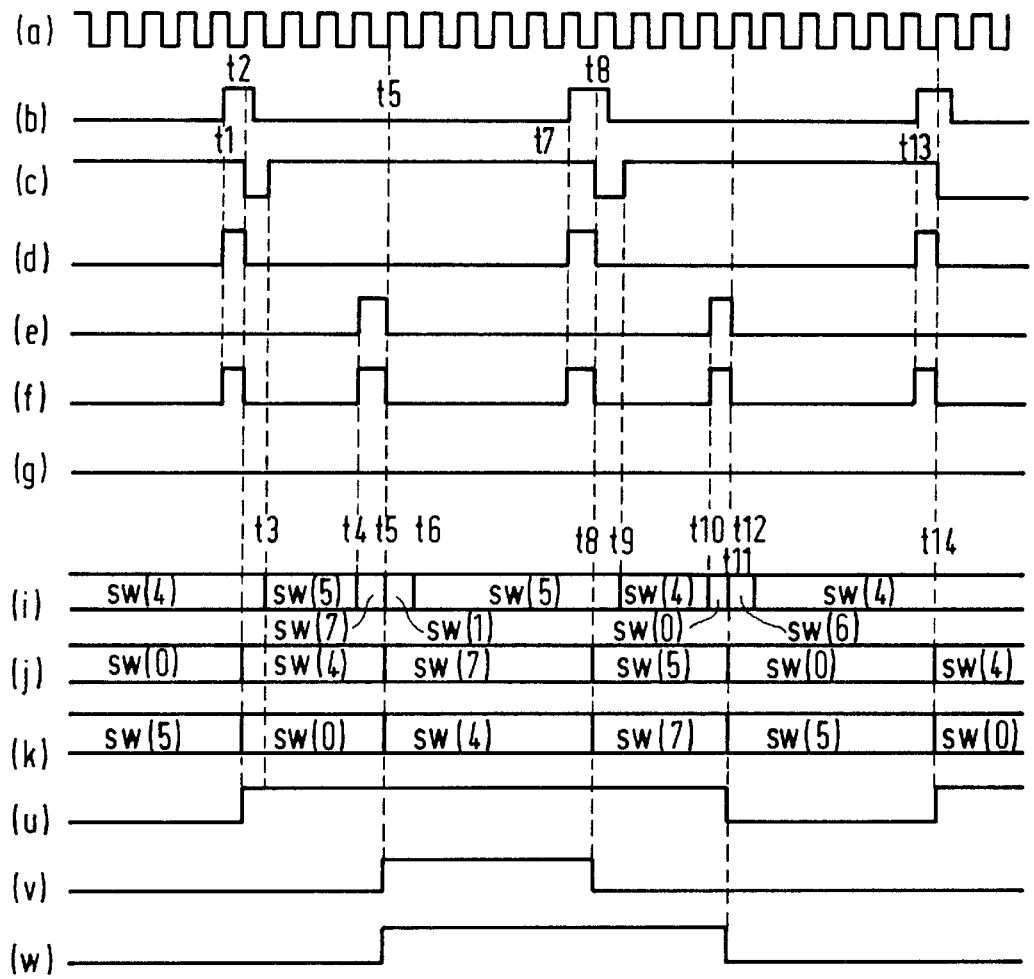
FIG. 9 is a diagram for the operation of the switching sequence logic circuit shown in FIG. 6.

The overall operation of embodiment 1, shown in FIG. 4, is explained with reference to FIGS. 6 and 9. FIG. 9 shows the operation waveforms of each part of switching sequence logic circuit 13. In FIG. 9, (a) is the clock signal sent to AND circuit 27; (b) is the sequence start command sent by sequence start circuit 14; (c) is the mismatch detection signal output by mismatch detection circuit 22; (d) is the output of AND circuit 24; (e) is the zero vector detection signal output by zero vector detection circuit 26; (f) is the output signal of OR circuit 25; (g) is the output signal of AND circuit 27; (i) is swn, the switching signal output by switching command vector selection table 21; (j) is swc, the switching signal output by latch circuit 23 and which is ultimately output to logic circuit 9 as the PWM signal; (k) is swo, the switching signal output by latch circuit 28; (u), (v), and (w) are respectively the U-phase, V-phase, and W-phase components of the switching command.

The voltage of an induction motor under the load of the PWM inverter shown in FIG. 4 is expressed by equation (5).

$$v(k) = L \cdot \frac{di}{dt} + R \cdot i + e \qquad (5)$$

where k=0, 1 . . . 7. Since coil resistance R is small, it may be ignored, so equation (5) can be transformed into equation (6).

$$\frac{di}{dt} = \frac{(v(k) - e)}{L} \qquad (6)$$

Since the left-hand side of the equation is the current differential di/dt, this equation shows that the current changes approximately in the angular direction of the vector (v(k)−e) and that the speed of change is |(v(k)−e)|.

In FIG. 9, until time t1, latch circuit 23 outputs switching command swc, which is equal to sw(0) and which is shown as (j). Therefore, switching elements SUN, SVN, and SWN of inverter 3 in FIG. 4 are on, and output voltage vector v(0) is 0. In this case, since the current differential is $$\frac{di}{dt} = \frac{(0-e)}{L} \qquad (7)$$

the current changes in accordance with the back electromotive force only.

Figure 10:
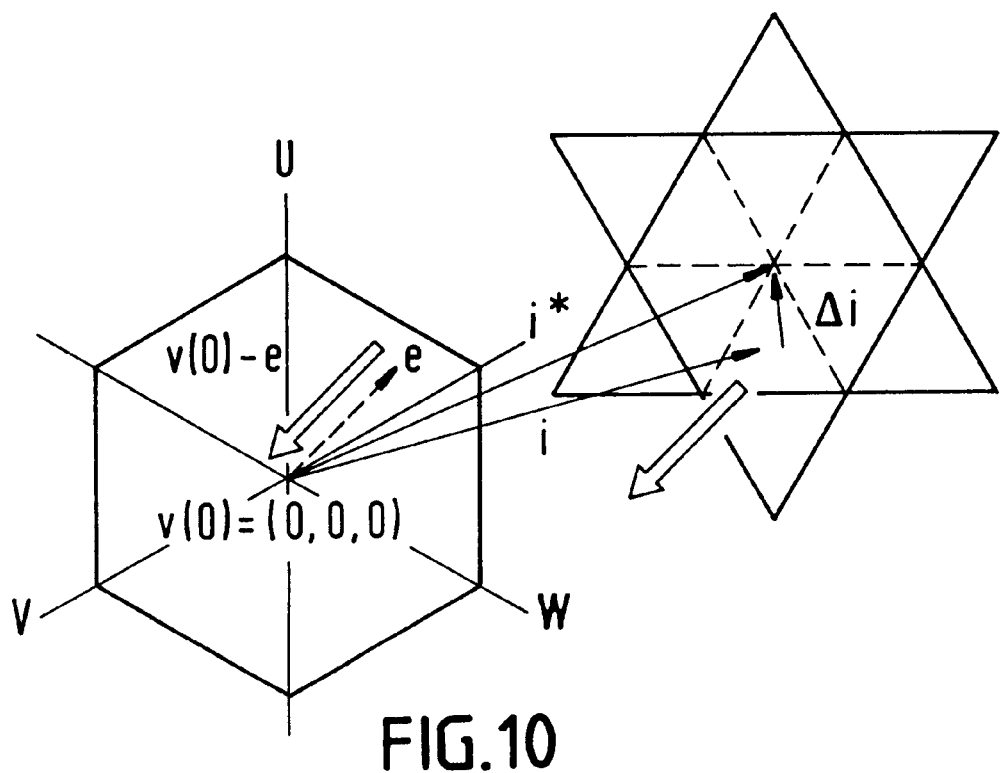
FIG. 10 is a relational diagram of the current and voltage vectors up to time t1 shown in FIG. 9.

The vector relationships in this case are shown in FIG. 10. The hexagon on the left is the voltage vector capable of being output by the inverter shown in FIG. 5. The dotted arrow indicates back electromotive force vector e. The allowable error range star shown in FIG. 8 is shown on the right. The current reference, the current vector, and the voltage vector are shown together with the origin. The tip of current reference i* is, of course, at the center of the star. In this case, it is assumed that current i is a vector of the type shown in the figure. Since current deviation Δi is a vector which points from the current vector tip to the current reference vector tip, the voltage vector whose angle is nearest to the angle of the current deviation vector in FIG. 10 is v(4).

Figure 11:
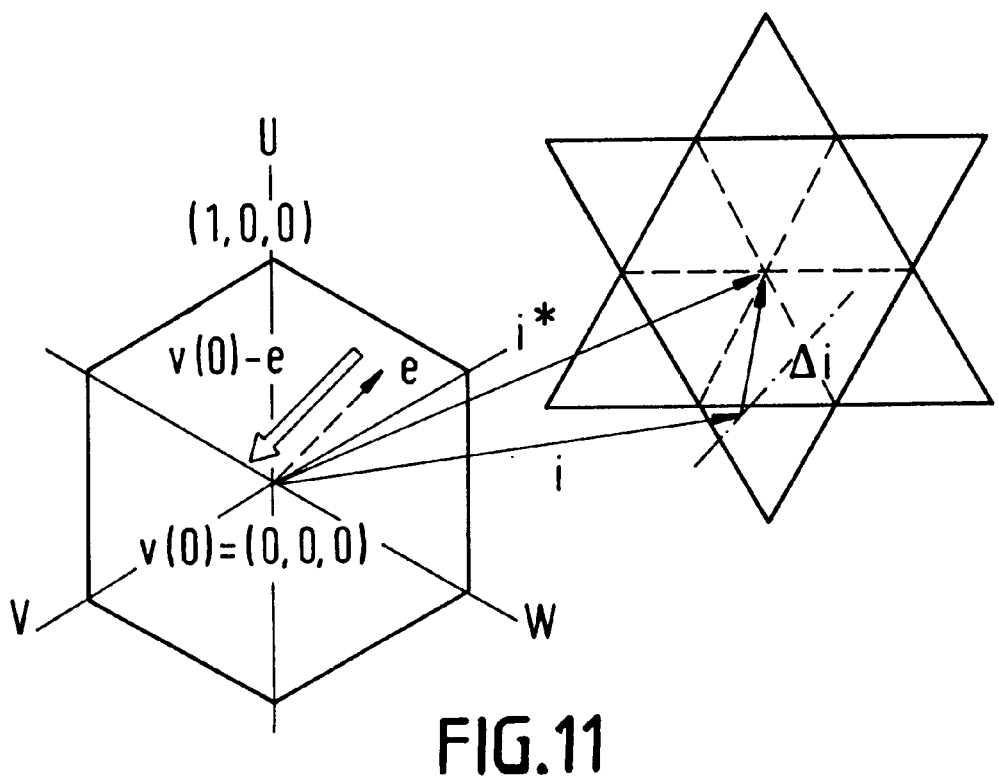
FIG. 11 is a relational diagram of the current and voltage vectors from time t1 to time t2 shown in FIG. 9.

Accordingly, the vector selection table in FIG. 6 selects v(4) as swn on the basis of table 2 then outputs it. Since the current changes in accordance with equation (5), in FIG. 10 it has the same magnitude as the back electromotive force vector, so the current changes as indicated by the white arrow pointing from the back electromotive force vector tip to the origin. The same white arrow is shown coming out of the current vector tip. That the current changes in the direction of this white arrow when the inverter outputs voltage vector v(0) is shown by equation (5). Therefore, the current vector changes with time as shown in FIG. 11, and the expression $$\Delta iu < -H$$

can be formulated. As a result, the output of comparator 30UN in FIG. 7 is 1 and, since swu is 0, the output of AND circuit 32UN also is 1, so switching sequence start circuit 14 in FIG. 4 outputs 1. In FIG. 9, the output of sequence start-circuit 14! is shown as (b), and its timing is shown as t1.

Since switching signal swn is sw(4) and switching signal swc is sw(0), because the output of mismatch circuit 22 before time t1 is logical value 1, at time t1, when the output of sequence start circuit 14 changes from 0 to 1, the output of AND circuit 24(d) becomes 1.

Since swn, the output of vector selection table 21, is sw(4), the output of zero vector detector 26 is 0. However, when the output of AND circuit 24(d) becomes 1, the output of OR circuit 25(f) also becomes 1.

At time t2, clock (a) rises and the output of AND circuit 27(g) becomes 1, causing latch circuits 23 and 28 to latch the data input at that time. The output of latch circuit 23(j) changes from sw(0) to sw(4), while the output of latch circuit 28(k) changes from sw(5) to sw(4). At this time, as shown in FIG. 11, current deviation vector Δi is −π/6<θΔi<π6. As shown in FIG. 9(i), vector selection table 21 continues to output sw(4) from table 3. As a result, the output of mismatch detection circuit 22 changes from 1 to 0, and the outputs of AND circuit 24, OR circuit 25, and AND circuit 27 all become 0.

Figure 12:
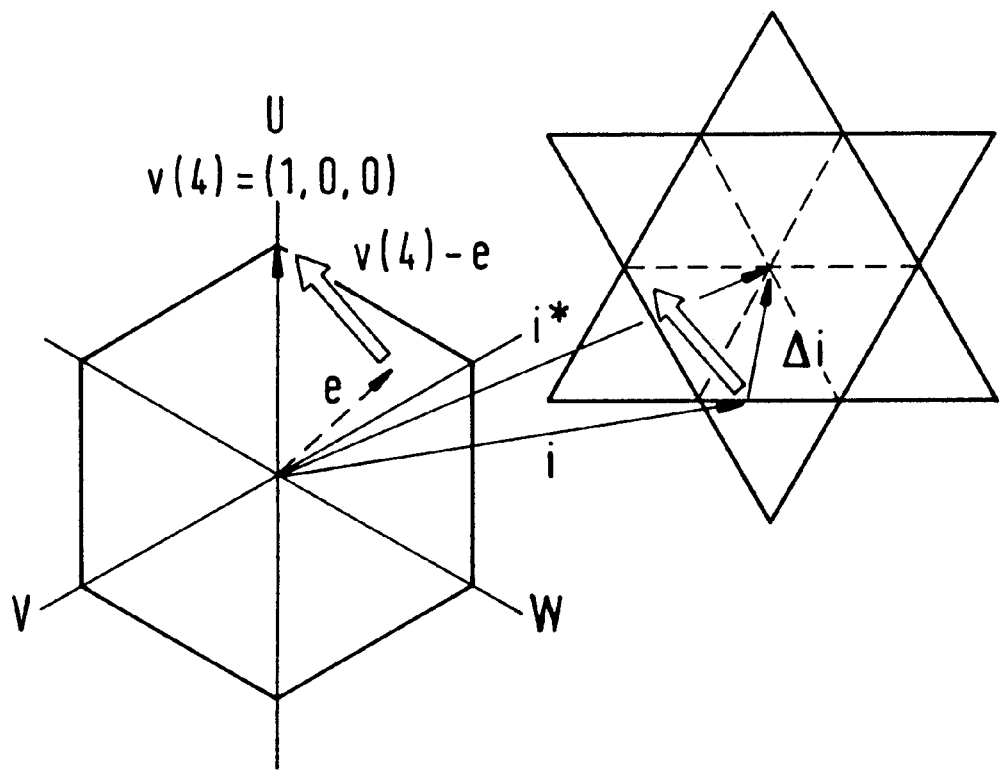
FIG. 12 is a relational diagram of the current and voltage vectors up to time t2 shown in FIG. 9.

FIG. 12 shows the vectors after switching signal swc has changed over to sw(4) at time t2. Since the inverter output voltage is v(4), the direction of change of the current is the direction of voltage v(4)−e indicated by the white arrow. Since the current changes while remaining within the allowable error range, the output of switch sequence start circuit 14(b) changes from 1 to 0 soon after time t2.

When the current changes towards the direction of the white arrow in FIG. 12, current deviation vector Δi rotates clockwise. Therefore, angle θΔi eventually leaves the range −π/6<θΔi<π/6, becomes greater than −π/6 (equal to 11π/6), and enters the range 3π/2<θΔi<11π/6. At time t3, when θΔi enters the range 3π/2<θΔi<11π/6, vector selection table 21 outputs switching signal sw(5) on the basis of table 3.

Figure 13:
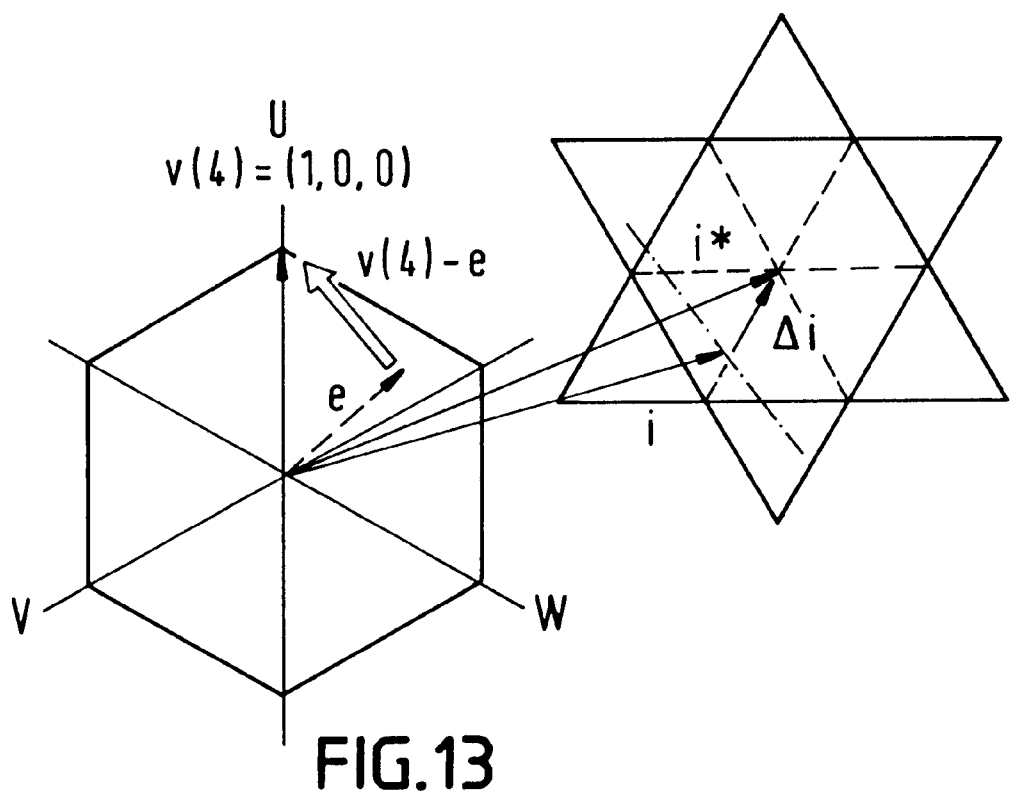
FIG. 13 is a relational diagram of the current and voltage vectors up to time t3 shown in FIG. 9.

The vector diagram for this time is FIG. 13. When the current vector tip moves along the dotted chain line and, in the allowable error range, crosses the line indicated by the W-axis component at the zero dotted line, θΔi<11π/6. As a result, the output of mismatch detection circuit 22 becomes 1, as shown in FIG. 9(c).

However, as can be seen from FIG. 13, the magnitude of deviation vector Δi is within the allowable error range, and since the output of sequence start circuit 14(b) is 0, the output of AND circuit 24(d) remains 0. Furthermore, since swn, the output of vector selection table 21, is sw(5), the output of zero vector detection circuit 26 also is 0, so the output of OR circuit 25(f) also is 0. Therefore, swc, the output of latch circuit 23, which is the PWM signal output, remains sw(4), and the current vector tip moves along the dotted chain line, eventually crossing the line indicated by the U-axis component at the zero dotted line.

Figure 14:
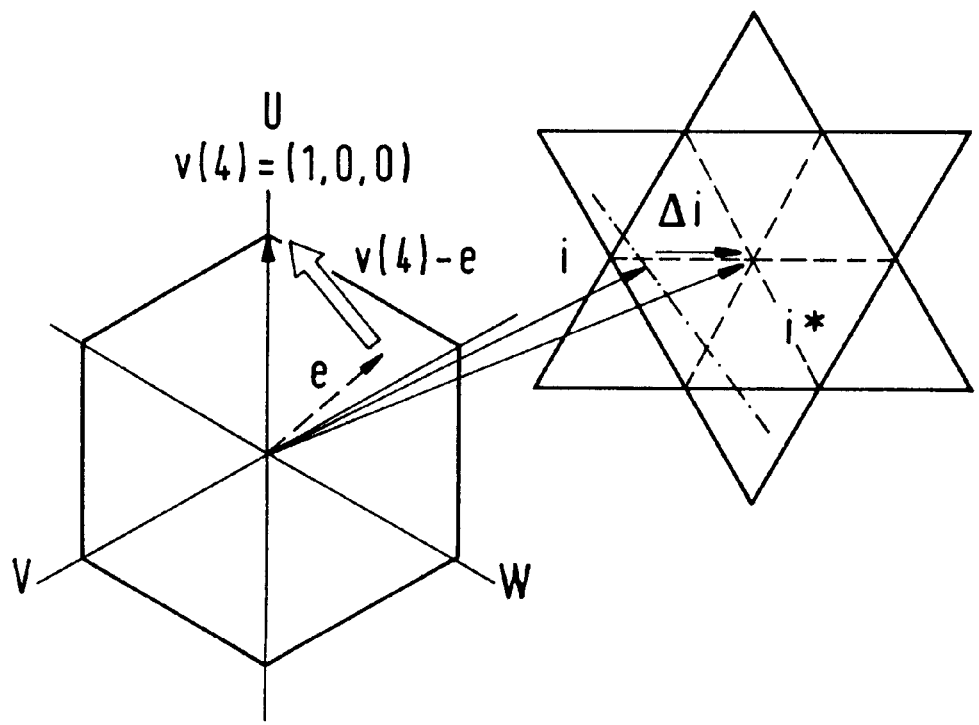
FIG. 14 is a relational diagram of the current and voltage vectors up to time t4 shown in FIG. 9.

The vector diagram for this time is FIG. 14. Since the current vector tip crosses the line indicated by the U-axis component at the zero dotted line, the current deviation vector angle enters the range 7π6<θΔi<3π/2. At time t4, swn, the output of vector selection table 21, changes from sw(5) to sw(7) in accordance with table 3. In movement towards the zero vector, vector sw(0) or vector sw(7) is selected by table 3 on the basis of not only the value of the swc being output but also the value of the swo that was being output before its value changed to that of swc. The value of the swc being output is sent from latch circuit 23, while the value of the swo that was being output before its value changed to that of swc is sent from latch circuit 28.

The reason for using the preceding swo value in zero vector selection in this way is basically to bring the switching signal movement close to the triangle-wave-comparison PWM movement sequence. The zero vector selection logic of table 3 is explained in the following.

If there has been a movement in state from two or more positive-side elements of the inverter being on to only one being on, when next moving to a zero vector, table 3 selects a signal which switches all of the positive-side elements off and all of the negative-side elements on. In other words, table 3 selects sw(0). Conversely, if there has been a movement in state from two or more negative-side elements of the inverter being on to only one being on, when next moving to a zero vector, table 3 selects a signal which switches all of the negative-side elements off and all of the positive-side elements on. In other words, table 3 selects sw(7).

Impossible movements have been omitted from table 3. If there is a movement from sw(5), sw(6), or sw(7) to sw(4), sw(0) will be selected when next moving to a zero vector. sw(4) is the switching signal which switches on one positive-side element only of the inverter, while sw(5), sw(6), and sw(7) are switching signals which switch on two or more positive-side elements of the inverter. Although switching signals which switch on two or more positive-side elements of the inverter also include sw(3), switching signals before sw(4) have been omitted from table 3 because movement from sw(3) to sw(4) is impossible using the logic of table 3. According to table 3, the only switching signals capable of movement from sw(3) are sw(1), sw(2), and zero vectors. Of course, the logic may also be that of adding sw(3) and selecting sw(0) when moving to sw(4) from one of sw(3), sw(5), sw(6), or sw(7) or when next moving to the zero vector.

Since there is no movement from sw(3) to sw(4), selections such as sw(3)→sw(4)→sw(0) also are impossible. As a result, at time t4, swn, the output of vector selection table 21, changes from sw(5) to sw(7), while the output of zero vector detection circuit 26 (e) changes from 0 to 1. As a result, irrespective of the output of AND circuit 24(d), the output of OR circuit 25(f) changes to 1. Therefore, at time t5, the rise timing of the next clock signal, the output of AND circuit 27(s) also rises, and latch circuits 23 and 28 latch the input data. The output of latch circuit 23(j) changes from sw(4) to sw(7), while the output of latch circuit 28(k) changes from sw(0) to sw(4). Since the output of switching sequence logic circuit 13 is the output signal of latch circuit 23, from time t5 onwards, the inverter is operated using switching signal sw(7).

An important feature of the inverter is that it can move the switching signal at time t5 when there is no request from sequence start circuit 14. Since inverter 3 is operated using switching signal v(7), and its output voltage vector is therefore sw(7), the current changes in accordance with the equation $$v(7)-e=-e$$

Figure 15:
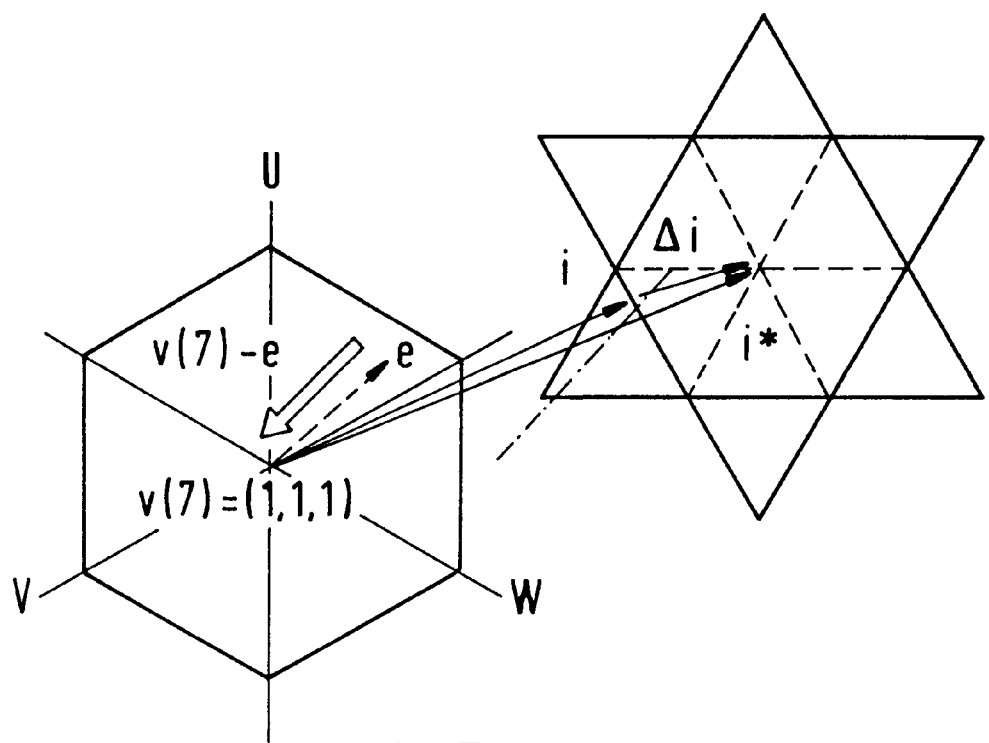
FIG. 15 is a relational diagram of the current and voltage vectors from time t4 to time t7 shown in FIG. 9.

Although the tip of current vector i moves along the straight line indicated by the dotted chain line in FIG. 15, and vector selection table 21 outputs sw(1) for a very short period, the current deviation vector rotates counterclockwise, and when its angle, θΔi, again enters the range $3\pi/2<\theta\Delta i<11\pi/6$ at time t6, sw(5) is output. Although the output of mismatch detection circuit 22(c) has remained 1 until this time, since the sequence start command (b) is 0, the output of AND circuit 24 is 0, and since the output of zero vector detector 26 also is 0, latch circuits 23 and 28 do not operate. The current moves further along the straight line indicated by the dotted chain line in FIG. 15 and reaches current vector i shown at time t7. At time t7, current i leaves the allowable error range Δiv>H. As a result, the output of comparator 30VP in FIG. 7 changes to 1.

Furthermore, since the inverter has until now been operated using switching signal sw(7), switching signal swv in FIG. 7 also is 1, so the output of AND circuit 32VP is 1, and sequence start circuit 13 outputs 1 as the sequence start command (b) via OR circuit 33. The output of OR circuit 25 via AND circuit 24 becomes 1. At the rising of the next clock pulse (a) at time t8, latch circuits 23 and 28 latch the input data.

Figure 16:
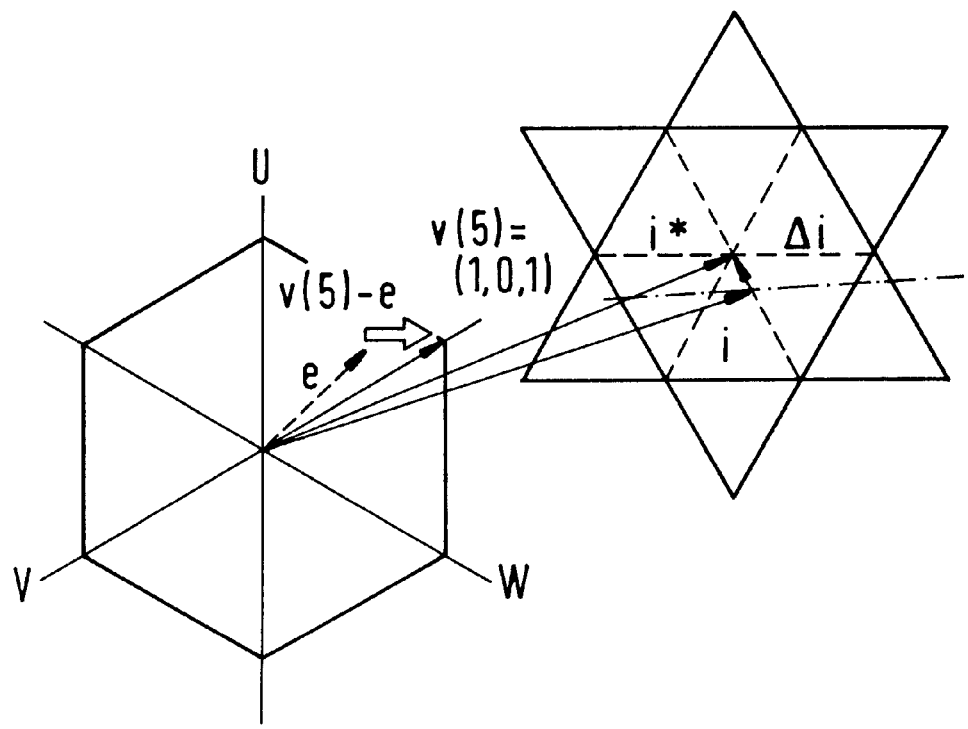
FIG. 16 is a relational diagram of the current and voltage vectors from time t7 to time t9 shown in FIG. 9.

The output of latch circuit 23(j) changes from sw(7) to sw(5), while the output of latch circuit 28(k) changes from sw(4) to sw(7). Since the vector selection table continues to output sw(5) from table 3, the output of mismatch detection circuit 22(c) changes from 1 to 0. Since inverter 3 is operated using sw(5), the current changes in accordance with v(5)−e, and the current vector tip moves along the dotted chain line in FIG. 16. As a result, the current deviation vector rotates counterclockwise, its angle at time t9, θΔi, reenters the range $-\pi/6<\theta\Delta i<\pi/6$, and vector selection table 21 outputs sw(4).

Although the output of mismatch detection circuit 21(c) changes to 1, since the sequence start command (b) is 0, the output of AND circuit 24 is 0, and since the output of zero vector detector 26 also is 0, latch circuits 23 and 28 do not operate. The current moves further along the dotted chain line until it reaches the position shown in FIG. 16. At time t10, when the current deviation vector angle enters the range $\pi/6<\theta\Delta i<\pi/2$, vector selection table 21 changes the output (1) to sw(0) on the basis of table 3.

Figure 17:
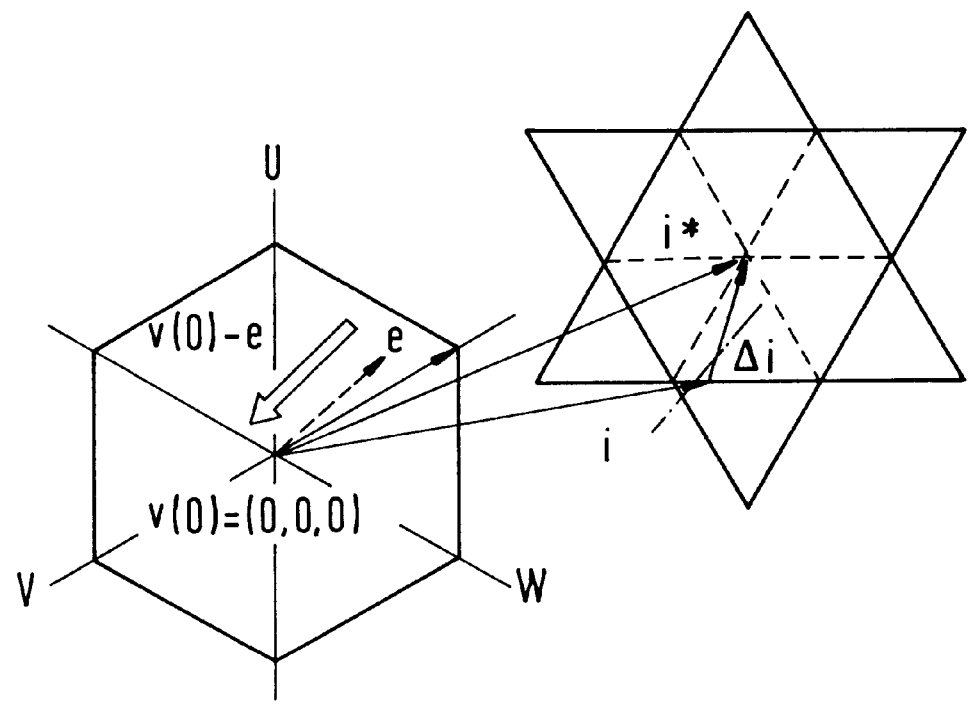
FIG. 17 is a relational diagram of the current and voltage vectors from time t11 to time t12 shown in FIG. 9.

Since the output of zero vector detector 26 becomes 1, and the output of OR circuit 25 also becomes 1, at the rising of the next clock pulse at time t11, the output of AND circuit 27 becomes 1, and latch circuits 23 and 28 latch the input data of that time. The output of latch circuit 23 changes from sw(5) to sw(0), while the output of latch circuit 28 changes from sw(7) to sw(5). Since the inverter output voltage becomes v(0), the current changes at v(0)−e and moves along the dotted chain line in FIG. 17, and vector selection table 21 outputs sw(6).

However, since current deviation vector angle θΔi is only just inside the range $\pi/6<\theta\Delta i$, it immediately returns to the range $-\pi/6<\theta\Delta i<\pi/6$ at the next current change, and vector selection table 21 outputs sw(4). As a result, the vector relationship reverts to the state it was in before time t1 in FIG. 9. When the current changes to the position shown in FIG. 17, at time t1 the changes explained above reoccur.

Figure 18:
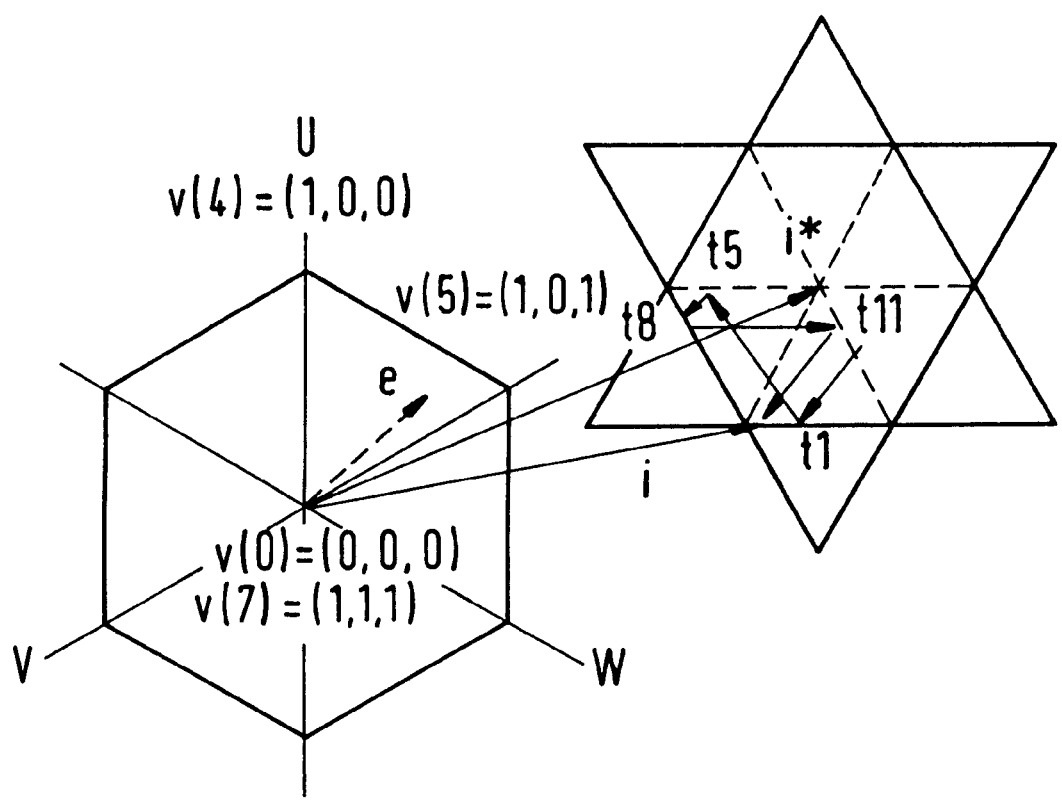
FIG. 18 is a locus diagram of the tip of the current vector when the current shown in FIGS. 10 to 17 changes.

The locus of the tip of the current vector in the above process is shown in FIG. 18. It can be seen that in the present invention the current is controlled using only a very small part of the allowable error range. Once a relationship between back electromotive force and current deviation of the type shown in FIG. 18 has been established, subsequently only v(4) and v(5) can be selected as nonzero-voltage vectors.

Since the inverter controller controls the current in such a way as to compensate changes in current due to −e when using zero-voltage vectors, it should output voltage vectors corresponding to back electromotive force e by combining the nonzero-voltage vectors it outputs. In FIG. 18, the two voltage vectors with the smallest magnitude of v(k)−e, namely, v(4) and v(5), are selected as these nonzero-voltage vectors. The combination of these two voltage vectors has the lowest rate of change of current, making it desirable in a steady state.

Moreover, the present invention enables the desired voltage vector only to be selected without detection of the back electromotive force vector.

Figure 19:
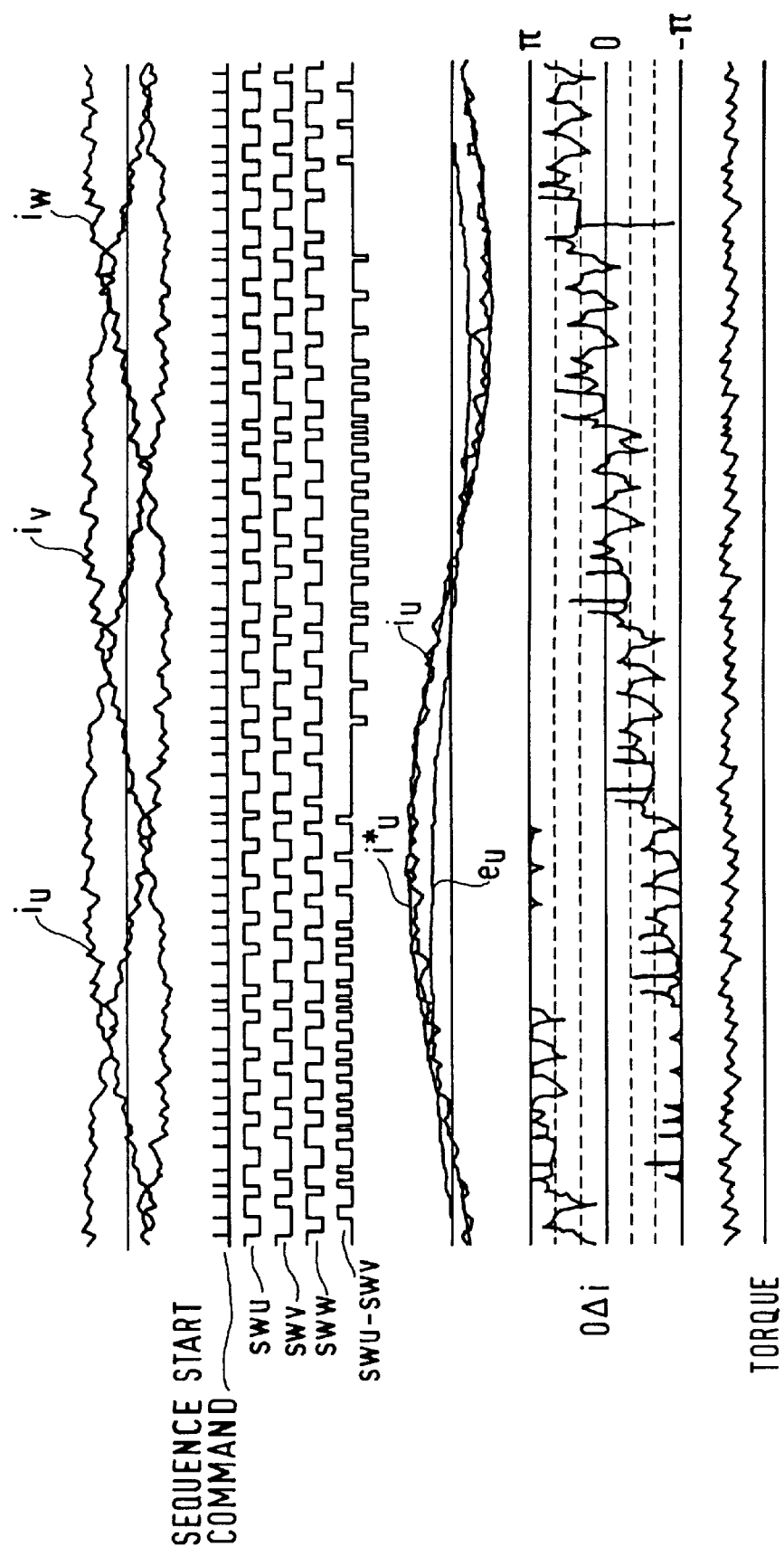
FIG. 19 shows the results of simulation of current control in an induction motor using embodiment 1 of the invention (steady state)

FIG. 19 shows the results of simulation of current control in an induction motor in a steady state using embodiment 1. The top row of the figure shows the U-phase, V-phase, and W-phase currents of the motor, while the next row shows the sequence start command signals of the sequence start circuit.

The next three signals are the U-phase, V-phase, and W-phase switching signals swu, swv, and sww. The next row shows swu-swv, which is a signal corresponding to the line voltage. The row below that shows i*u, iu, and eu, which are the U-phase components of the current reference, the current, and the back electromotive force. The bottom row shows the torque.

As can be seen from swu-swv, in FIG. 19 there are no back pulses. Although back pulses sometimes occur as a result of factors such as control sampling and the value of allowable error range setting value H, they can be suppressed in such cases by increasing the frequency of the clock pulse (a) in FIG. 9. Increasing the frequency of the clock pulse (a) shortens the period during which the difference in angle between the voltage vector being output and the current deviation vector is equal to or greater than ±90 degrees (in FIG. 9, the periods between time t4 and time t5 and between time t10 and time t11). In other words, excessive movement is reduced. Therefore, the return also becomes faster, and the period during which the vector selection table outputs sw(1) and sw(6) immediately after each period becomes shorter. As a result, the likelihood that sw(1) and sw(6) will be latched by latch circuit 23 is reduced.

In this way, the present invention suppresses back pulses and reduces the needless switching of conventional hysteresis-band PWM.

Figure 20:
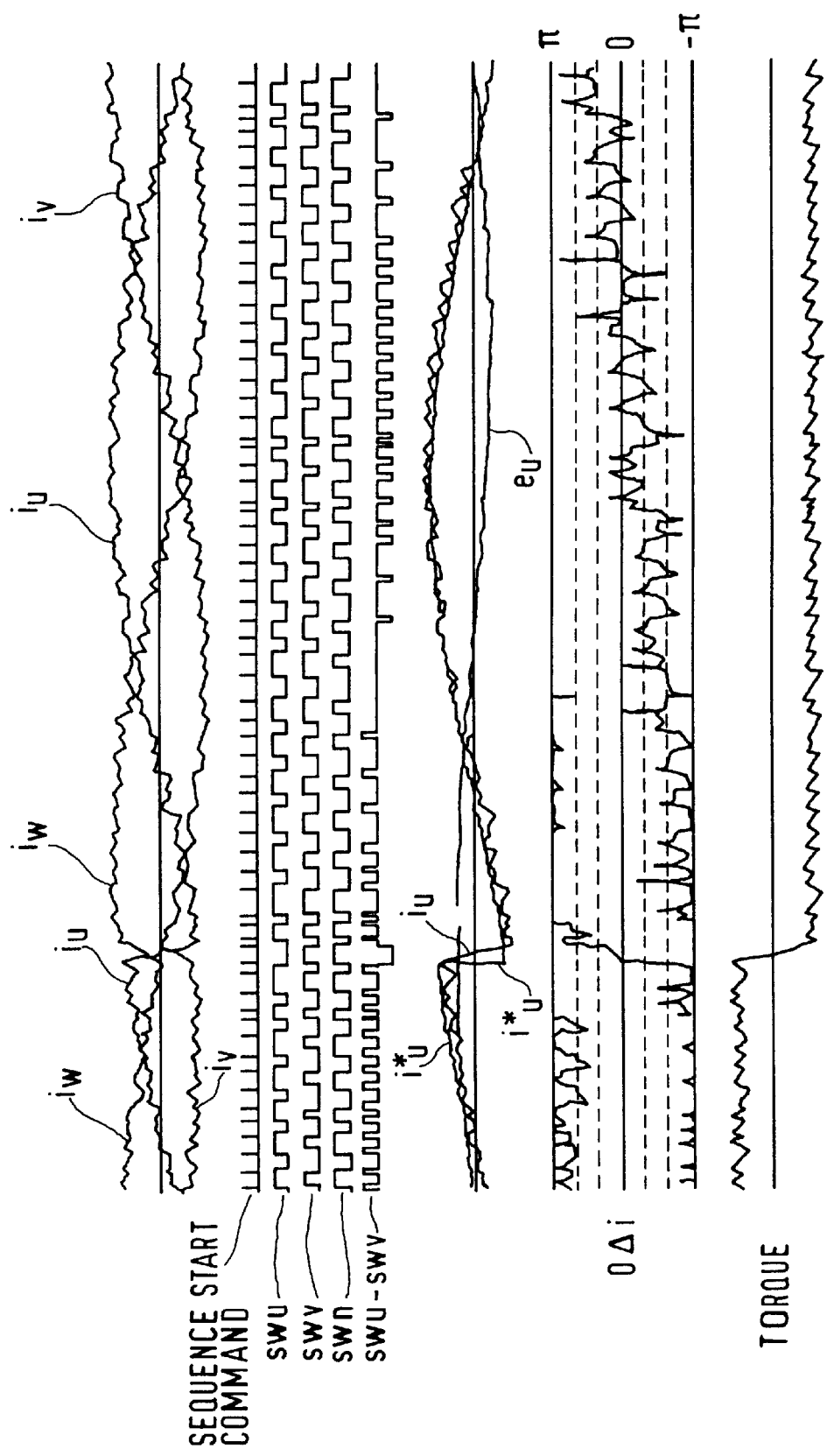
FIG. 20 shows the results of simulation of current control in an induction motor using embodiment 1 of the invention (sudden change in current command)

FIG. 20 shows simulated waveforms for the case of a sudden change of current command in which the absolute value of the torque remains the same while its sign is changed in steps from positive to negative in current control in an induction motor using embodiment 1. It can be seen that current control is performed correctly even in a transition state such as this.

In transition states in which the current command changes suddenly, although one or both of the following occur, the current complies rapidly with the command.

(1) The current deviation magnitude cannot be contained within the allowable error range.

(2) Current deviation vector angle θΔi changes suddenly.

In embodiment 1, the vectors are selected by tables 2 and 3, and because their logic allows only movement between adjacent nonzero-voltage vectors in the direct movement between the six nonzero-voltage vectors shown in FIG. 5, suppression of back pulses in the line voltage in a steady state has been achieved. In transition states, there is sometimes a need for widely separated nonzero-voltage vectors that are not adjacent to nonzero-voltage vectors already output.

In such cases, the operation moves first to a zero vector in accordance with the logic shown in table 3 then outputs a nonzero-voltage vector again in accordance with the logic shown in table 2. In other words, even if it is via a zero vector, movement between all nonzero-voltage vectors that can be output is allowed, thus enabling rapid current control in transition states.

In FIG. 20, although the torque value changes from a positive value to a negative value in a straight line, the speed of change is determined by the inverter output voltage, the back electromotive force, and the inductance. As a result, very rapid response not possible with PI or other types of control can be achieved, irrespective of the modulation frequency. In low-speed switching devices such as GTOs, since allowable error range setting value H must be made large, the current ripple in a steady state becomes large. However, in transition states such as those involving a sudden change in the current reference or a change in the current due to a disturbance other than the load, a rapid response similar to that when using high-speed switching elements can be obtained. This type of rapid response has been achieved using conventional hysteresis-band PWM control also.

However, in addition to rapid response, using the same control logic as for a transition state, embodiment 1 also enables PWM control with reduced harmonic waves in a steady state, which is not possible with conventional hysteresis-band PWM control. Furthermore, since there is no need for back electromotive force information, PWM control that is resistant to noise can be achieved.

In embodiment 1, although the desired voltage vector only is selected in a steady state, the number of switchings at the time of voltage vector movement is a problem.

The change in switching signal swc in FIG. 9 is sw(0)→sw(4)→sw(7)→sw(5)→sw(0). In the movement from sw(4) to sw(7), the V-phase and W-phase components of the switching signal change simultaneously from 0 to 1, while in the movement from sw(5) to sw(0), the U-phase and W-phase components of the switching signal change simultaneously from 1 to 0. In other words, if triangle-wave-comparison PWM in which switching is performed using two phases for vector movement, a switching signal will be generated so that the movement is sw(0)→sw(4)→sw(5)→sw(7)→sw(5)→sw(4)→sw(0). In terms of number of switchings, this sequence is the most effective in reducing harmonic waves.

It can be seen from (i) in FIG. 9 that switching signal sw(5) is output from the voltage vector selection table at time t3, and if this switching signal can be reflected in the output, then the vector movement sw(0)→sw(4)→sw(5) will become possible.

Figure 21:
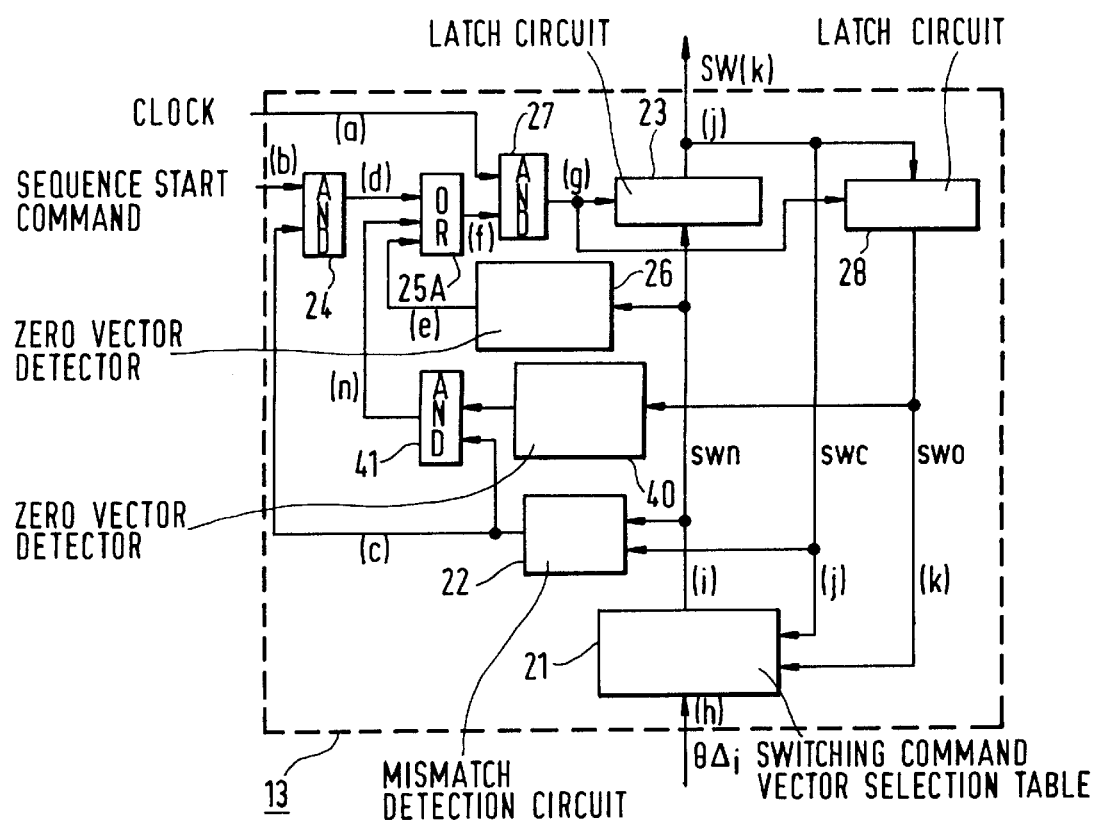
FIG. 21 is a detailed configuration diagram of the switching sequence logic circuit in embodiment 2 of the invention.

The configuration of a modified version of switching sequence logic circuit 13, which is used to achieve this, is shown in FIG. 21. In the figure, 21 to 24 and 26 to 28 are the same structural elements as those in the circuit shown in FIG. 6. 40 is a zero vector detector, 41 is an AND circuit, and 25A is a three-input OR circuit. Zero vector detector 40 detects whether or not the output of latch circuit 28 is a zero vector. If the output is a zero vector, zero vector detector 40 outputs 1, while if the output is not a zero vector, zero vector detector 40 outputs 0.

AND circuit 41 receives the output of zero vector detector 40 and the output of mismatch detection circuit 25. OR circuit 25A receives the output of AND circuit 41 in addition to the same inputs as OR circuit 25 in FIG. 21.

Furthermore, in embodiment 1, table 2 is used in the selection of vectors from zero vector switching signals sw(0) and sw(7). In the table, since the switching signal is selected only on the basis of the current deviation vector angle, movement requiring two-phase switching such as sw(0)→sw(5) or sw(7)→sw(4) also was allowed.

To avoid this, table 4, shown below, is used. If the switching command being output is sw(0), the switching commands capable of movement will be sw(4), sw(2), and sw(1), which end in single-phase-only switching, and the switching signal whose angle difference from the current deviation vector has the smallest voltage vector will be selected from among these three switching signals. In the same way, if the switching command being output is sw(7), the switching signal will be selected from among sw(6), sw(3), and sw(5), which end in single-phase-only switching. For movements from other than a zero vector, table 3 is used in the same way as in embodiment 1.

TABLE 4

| SWITCHING COMMAND BEING OUTPUT swc | PRECEDING SWITCHING COMMAND swo | CURRENT DEVIATION VECTOR ANGLE θΔi | | | | | |
|---|---|---|---|---|---|---|---|
| | | 0 ~−π/3 | π/3 ~−2π/3 | 2π/3 ~−π | π ~−4π/3 | 4π/3 ~−5π/3 | 5π/3 ~−2π |
| sw(6) sw(1) | ALL OF sw(0) TO sw(7) | sw(4) sw(6) | sw(2) sw(6) | sw(2) sw(3) | sw(1) sw(3) | sw(1) sw(5) | sw(1) sw(5) |

Figure 22:
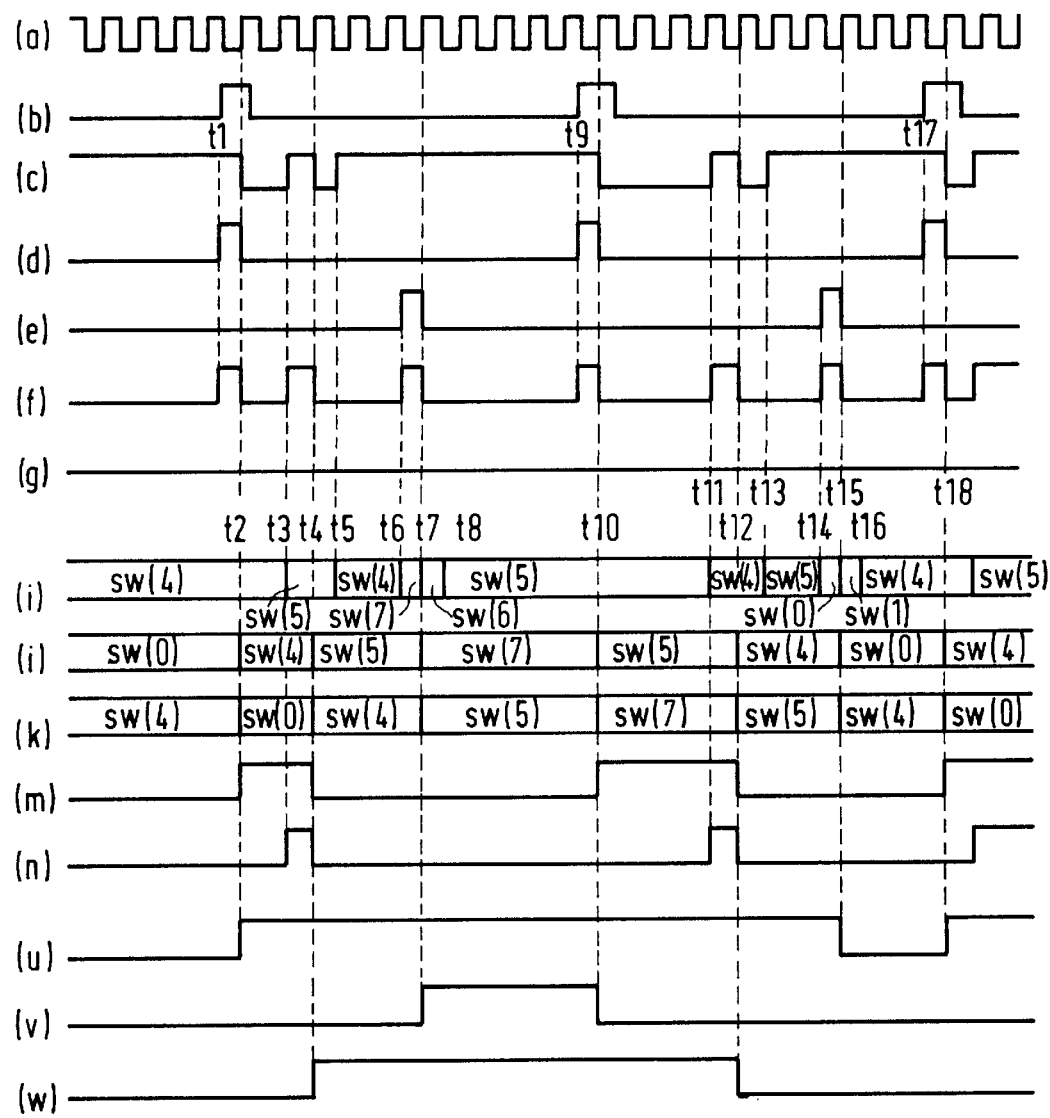
FIG. 22 is a diagram for the operation when using the switching sequence logic circuit shown in FIG. 21.

The following is an explanation based on operation when using the switching sequence logic circuit in FIG. 21 and table 4 instead of table 2. FIG. 22 is the same as FIG. 9 except that the output of zero vector detector 40(m) and the output of AND circuit 41(n) have been added and that (f) has been changed from the output of two-input OR circuit 25 to that of three-input OR circuit 25A.

Figure 23:
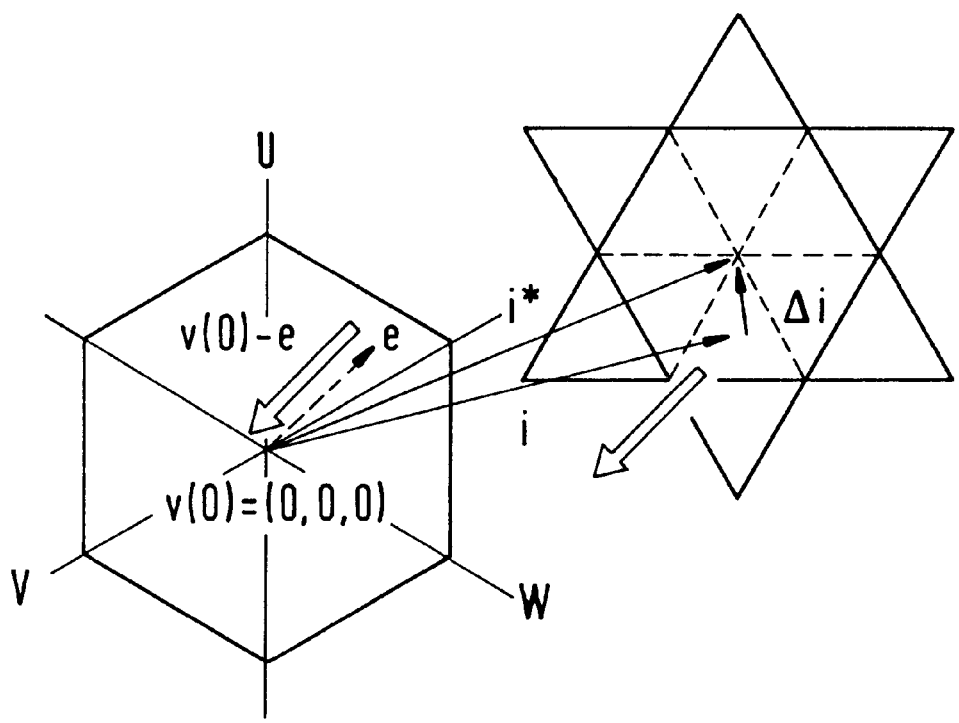
FIG. 23 is a relational diagram of the current and voltage vectors up to time t1 shown in FIG. 22.

The voltage-current vector relationship shown at the left-hand edge of FIG. 22 is assumed to be that shown in FIG. 23. The current due the back electromotive force changes, and the vector relationship at time t1 is that shown in FIG. 24. According to the logic of table 2, since the voltage vector whose angle has been nearest to the current deviation vector up to this time is v(4), sw(4) is selected. In the case of embodiment 2, although the result is the same, sw(4) is selected on the basis of table 4. If the voltage vector whose angle is nearest to the current deviation vector is not v(4), and even if it were v(5), since the switching signal is sw(0), sw(4) will be selected. When the magnitude of the current deviation vector exceeds the allowable error range at time t1, the sequence start command (b) is sent.

As in embodiment 1, at the next rising of the clock (a) at time t2, a latch timing command (g) is sent via AND circuit 24, OR circuit 25A, and AND circuit 27 to latch circuits 23 and 28. The output of latch circuit 23(j) changes from sw(0) to sw(4), while the output of latch circuit 28(k) changes from sw(4) to sw(0). The current deviation vector angle immediately after time t1 is the same as it was immediately before time t1.

Figure 24:
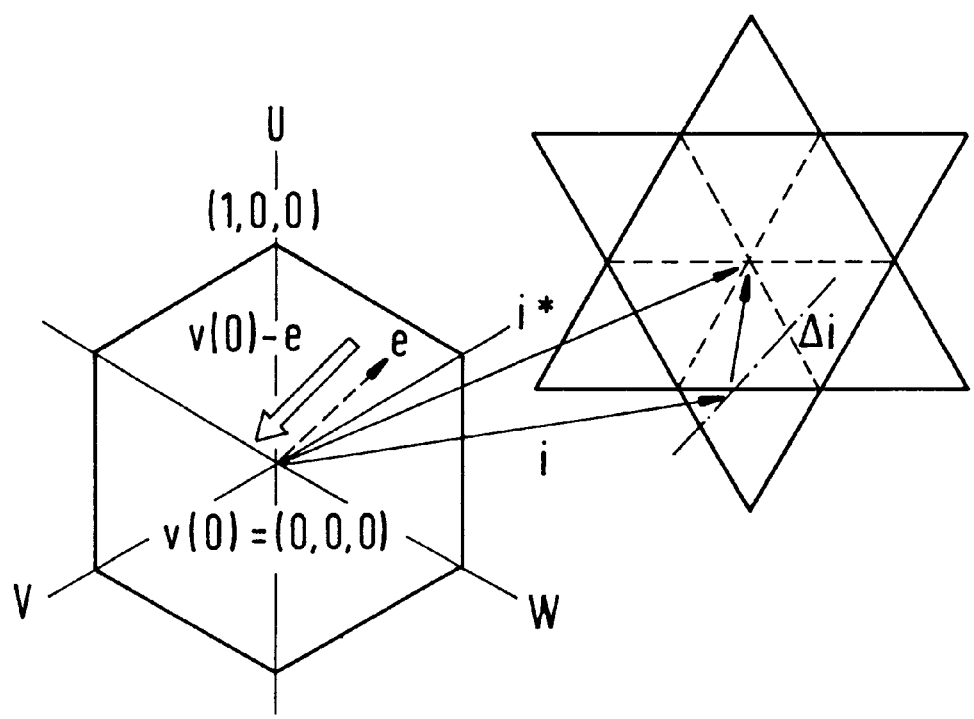
FIG. 24 is a relational diagram of the current and voltage vectors at time t1 shown in FIG. 22.

In the case of FIG. 24, it is evident that the voltage vector whose angle is nearest to the current deviation vector is v(4), so vector selection table 21 continues to output sw(4) in accordance with table 3 (i). Since swc, the output of latch circuit 23, and the output of vector selection table 21 are the same, the output of mismatch detection circuit 22(c) becomes 0, while the output of AND circuit 24 also reverts to 0. Meanwhile, the output of additional zero vector detector 40(m) becomes 1 at time t2. However, since the output of mismatch detection circuit 22 is 0, the output of AND circuit 41(n) also is 0. Therefore, the outputs of OR circuit 25A and AND circuit 27 also are 0.

Figure 25:
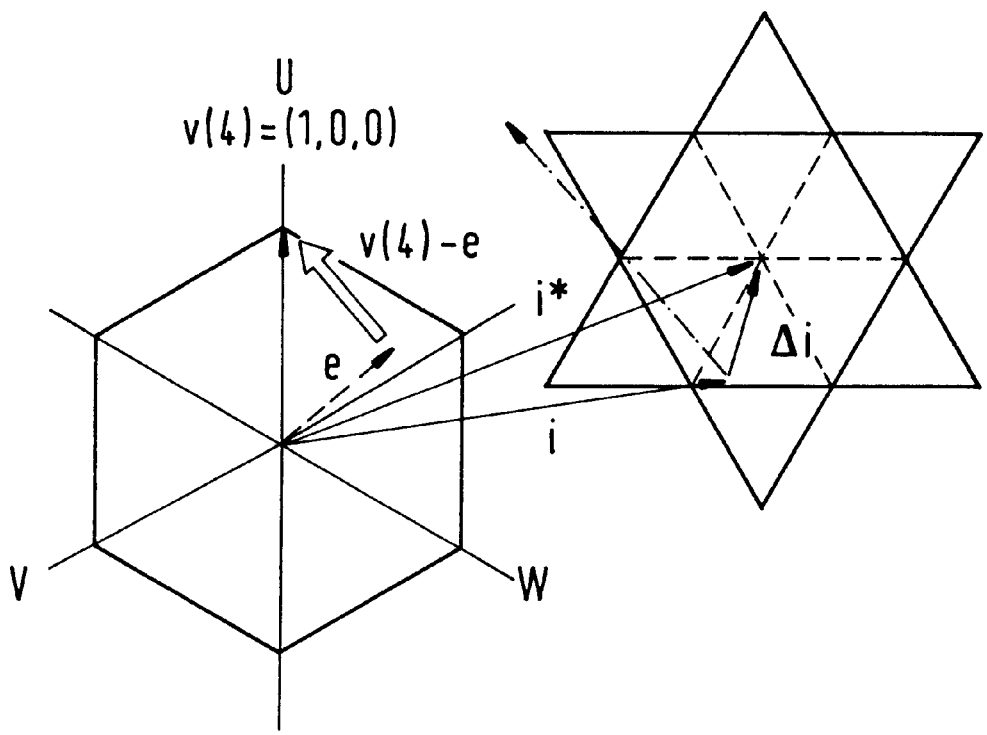
FIG. 25 is a relational diagram of the current and voltage vectors at time t2 shown in FIG. 22.
Figure 26:
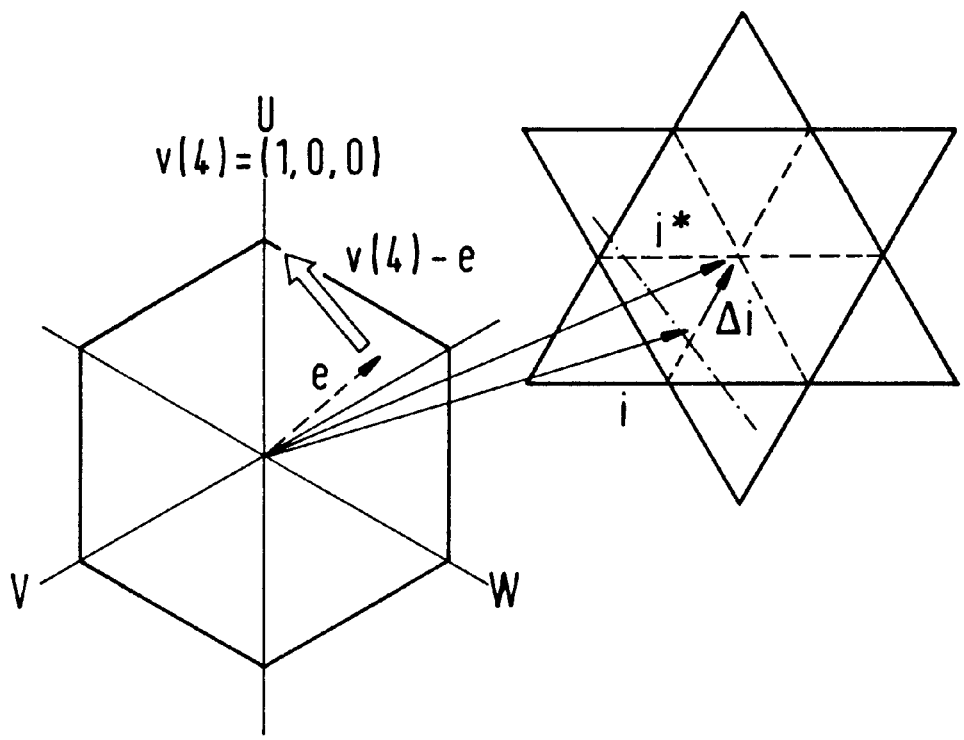
FIG. 26 is a relational diagram of the current and voltage vectors from time t2 to time t4 shown in FIG. 22.

Since the direction of the current changes to that of the dotted chain line in FIG. 25 as a result of voltage vector v(4) and back electromotive force e, the current deviation vector rotates clockwise. At time t3, when θΔi moves from the range −π/6 to π/6 to the range 3π/6 to 11π/6, vector selection table 21 outputs sw(5) in accordance with table 3.

As a result, the output of mismatch detection circuit 22(c) changes to 1. Since the output of additional zero vector detector 40 becomes 1 from time t2, the output of AND circuit 41(n) and the output of OR circuit 25A(f) also become 1.

Therefore, at the next rising of the clock (a) at time t4, the output of AND circuit 27(g) becomes 1 and latch circuits 23 and 28 operate.

The output of latch circuit 23 changes from sw(4) to sw(5), while the output of latch circuit 28 changes from sw(0) to sw(4). Since the output of latch circuit 23 and the output of vector selection table 21 are both sw(5), the output of mismatch detection circuit 22 becomes 0, and the output of OR circuit 25A(f) and the output of AND circuit 27(g) both revert to 0. Since the output of latch circuit 28 now becomes sw(4), the output of zero vector detector 40(m) also reverts to 0.

Figure 27:
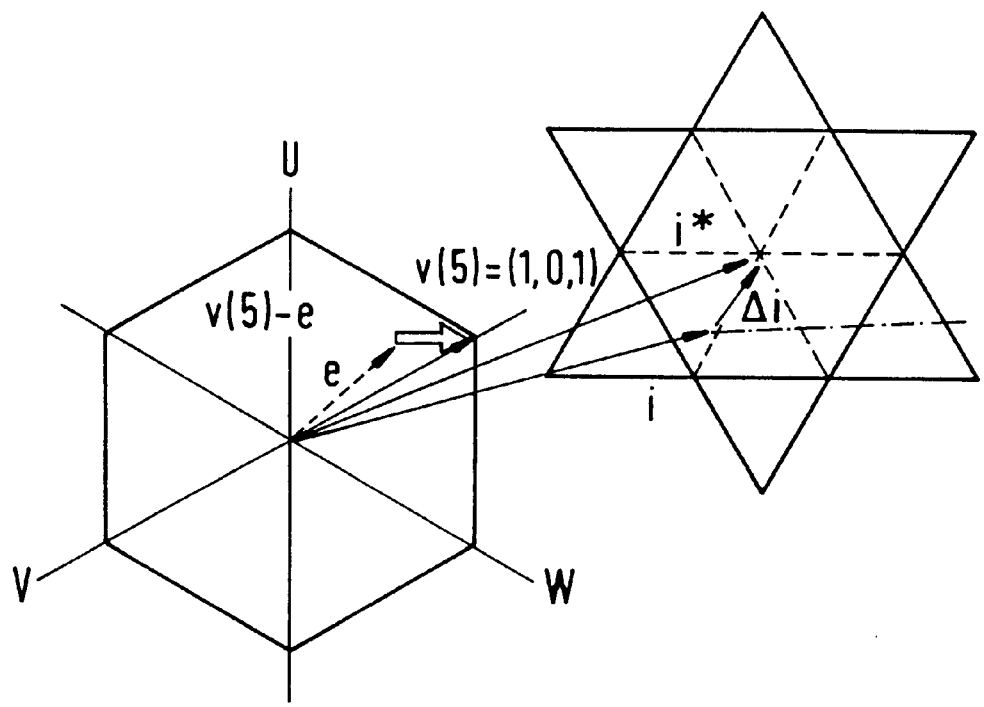
FIG. 27 is a relational diagram of the current and voltage vectors from time t4 to time t6 shown in FIG. 22.

From time t4, since the current changes along the dotted chain line in FIG. 27, the current deviation vector rotates counterclockwise. At time t5, θΔi moves from the range 3π/2 to 11π/6 to the range −π/6 to π/6, and vector selection table 21 outputs sw(4) in accordance with table 3.

The period between time t3, when θΔi moves from the range −π/6 to π/6 to the range 3π/2 to 11π/6, and time t4, when θΔi was reflected in the PWM signal, is very short, not exceeding one cycle of the clock (a). Therefore, as expected, the period between time t4 and time t5, when θΔi returns to the range −π/6 to π/6 from the range 3π/2 to 11π/6, also is very short. Although FIG. 22 shows that θΔi returns to the range −π/6 to π/6 within one clock cycle, the actual time taken is the period of delay in the main circuit operation speed.

However, in comparison with the period from time t1 to time t17 in FIG. 22, which represents one PWM cycle, the period from time t3 to time t5 is very short. At time t5, vector selection table 21 outputs sw(4), and the output of mismatch detection circuit 22(c) becomes 1. Since the output of latch circuit 28 is sw(4), the output of zero vector detector 40 is 0, so the outputs of AND circuit 41, OR circuit 25A, and AND circuit 27 remain 0.

Figure 28:
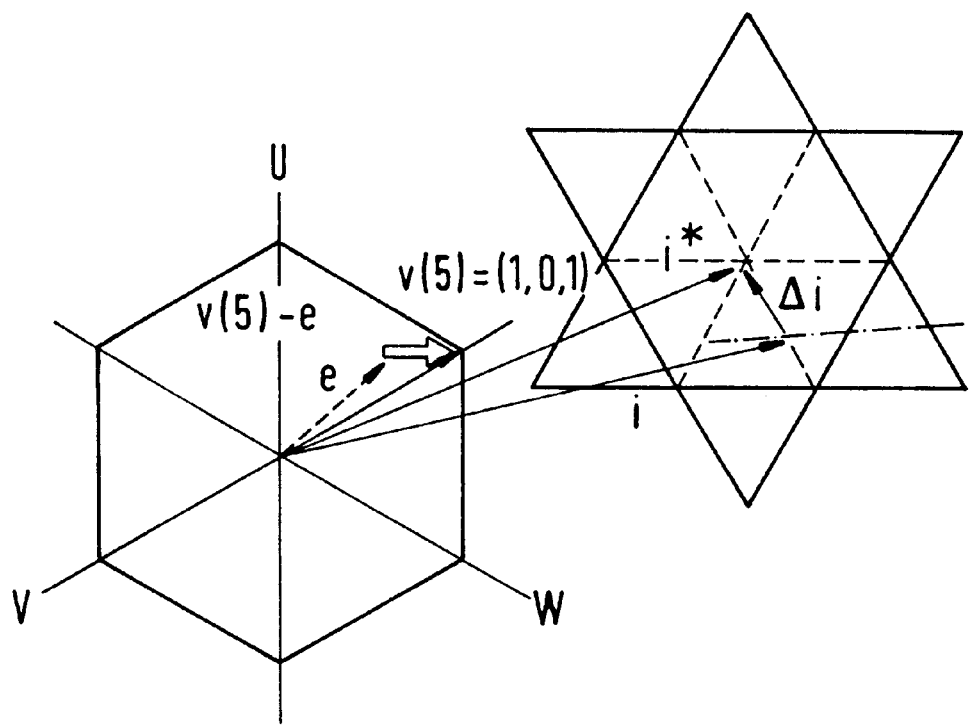
FIG. 28 is a relational diagram of the current and voltage vectors at time t6 in FIG. 22.

Therefore, the inverter continues to be operated using PWM signals based on sw(5), and the vector relationship at time t6 is that shown in FIG. 28. θΔi moves from the range −π/6 to π/6 to the range π/6 to π/2. Since the output of latch circuit 23(j) is sw(5) and the output of latch circuit 28(k) is sw(4), vector selection table 21 outputs sw(7) from table 3. Since the output of zero vector detector 26 becomes 1, the output of OR circuit 25A also becomes 1, and at the next rising of the clock (a) at time t7, the output of AND circuit 27(g) becomes 1. A latch command is sent to latch circuits 23 and 28. The output of latch circuit 23 changes from sw(5) to sw(7), while the output of latch circuit 28 changes from sw(4) to sw(5).

Since latch circuit output sw(7) has now become a zero vector, vector selection table 21 selects the vector on the basis of table 4. Since θΔi has changed from being less than π/6 to being more than π/6, in accordance with the distribution of angles in table 4, θΔi is included in the range π/3 to 0, and since the signal being output is sw(7), the output of the vector selection table becomes sw(6).

When the output of latch circuit 23, that is, the output of switching sequence logic circuit 13, becomes a zero vector, switching sequence logic circuit 13 continues to output a zero vector until it receives a start command ((b) in FIG. 22) from outside. The vector relationship becomes that shown in FIG. 29, with the current moving along the dotted chain line and the current deviation vector rotating clockwise, and θΔi, the current deviation vector angle, returning from the range π/3 to 0 to the range 5π/3 to 2π.

As a result, from table 4, the output of the vector selection table changes from sw(6) to sw(5). In FIG. 22, the timing of this change is shown as time t8.

Figure 29:
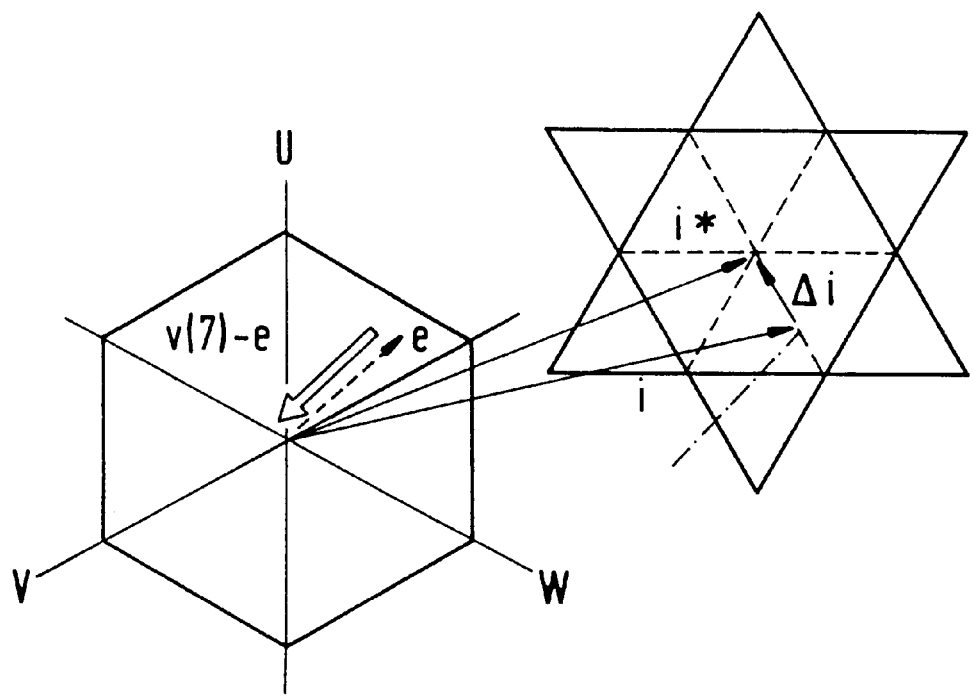
FIG. 29 is a relational diagram of the current and voltage vectors from time t6 to time t9 shown in FIG. 22.

Since the output of switching sequence logic circuit 13 is sw(7), sequence start circuit 14 will not operate, even if the current leaves the hexagonal error range when moving along the dotted chain line in FIG. 29. This is because the U-phase switching signal has already become 1.

Figure 30:
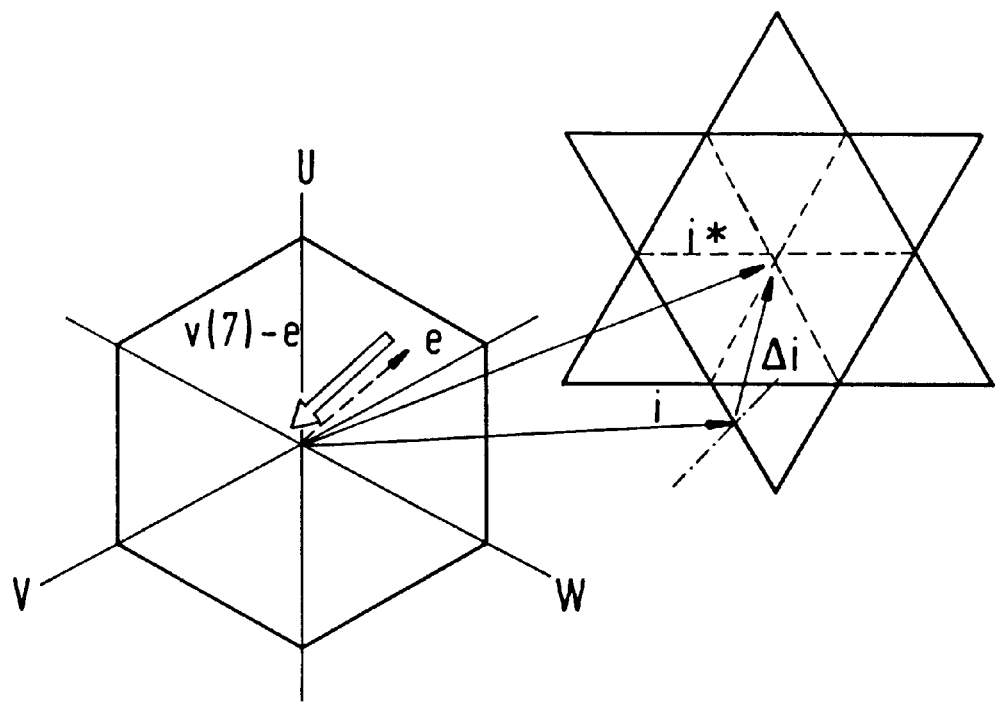
FIG. 30 is a relational diagram of the current and voltage vectors at time t9 in FIG. 22.

Therefore, since, the V-phase switching signal is out of the inverse triangle error range, moreover, at time t9, when the V-phase deviation exceeds positive setting value H, sequence start circuit 14 outputs start signal 1. The vector relationship at this time is shown in FIG. 30. At the rising of the next clock pulse at time t10, the output(j) of latch circuit 23 changes from sw(7) to sw(5), while the output of latch circuit 28(k) changes from sw(5) to sw(7).

Since the operation from time t10 to time t18 is similar to that from time t2 to time t10, its explanation has been omitted.

In accordance with the above, as shown in FIG. 22, vector movement is in the sequence sw(0)→sw(4)→sw(5)→sw(7) →sw(5)→sw(4)→sw(0). Phase components (u), (v), and (w) show that switching is performed only once when the vector moves.

Since the vector movement between time t7 and time t10 and the operation of sequence start circuit 14 differ slightly in accordance with the current-voltage vector relationship, the sequence sw(0)→sw(4)→sw(5)→sw(7)→sw(6)→sw(4) →sw(0) is possible. However, in phase components (u), (v), and (w), there is still the need for only one switching.

Figure 31:
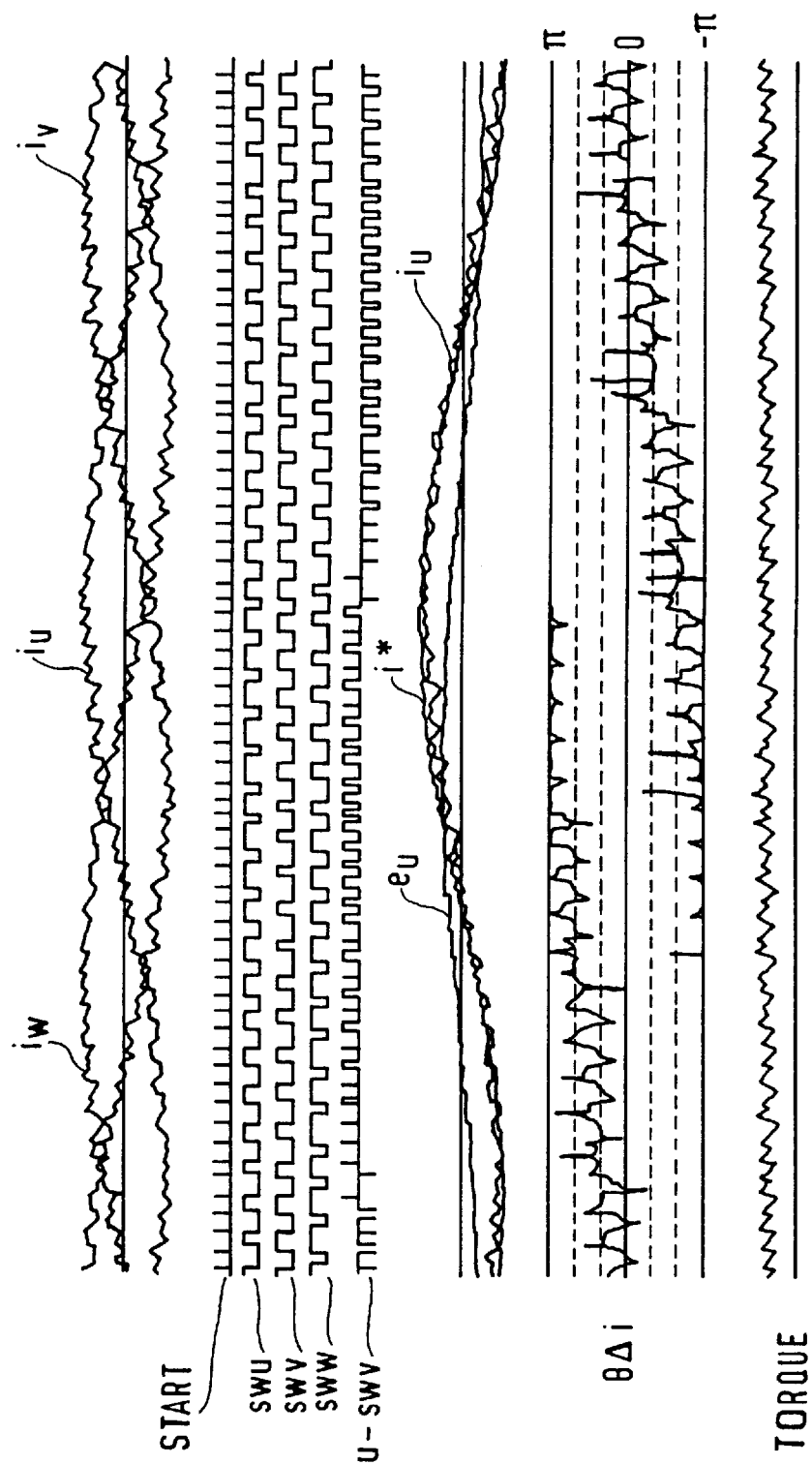
FIG. 31 shows the results of simulation of current control in an induction motor using embodiment 2 of the invention (steady state)

The results of simulation of waveforms in an induction motor using embodiment 2 under the same operating conditions as in FIG. 19 are shown in FIG. 31. Although the number of switchings for each phase is almost the same as in FIG. 19, it can be seen that there are more pulses in the line voltage. This enables harmonic waves to be reduced even further.

As described above, by using embodiment 2, it is possible not only to select a voltage vector with a gentle current change in a steady state but also to reduce harmonic waves even further by increasing the number of pulses in the line voltage for the same number of switchings.

So far, the embodiments have been explained using sequence start circuit 14, which starts the switching sequence when the current deviation exceeds the allowable error. In this way, in PWM control in which the current deviation has been maintained within a prescribed range, the switching frequency changes in accordance with the speed of the motor.

Figure 32:
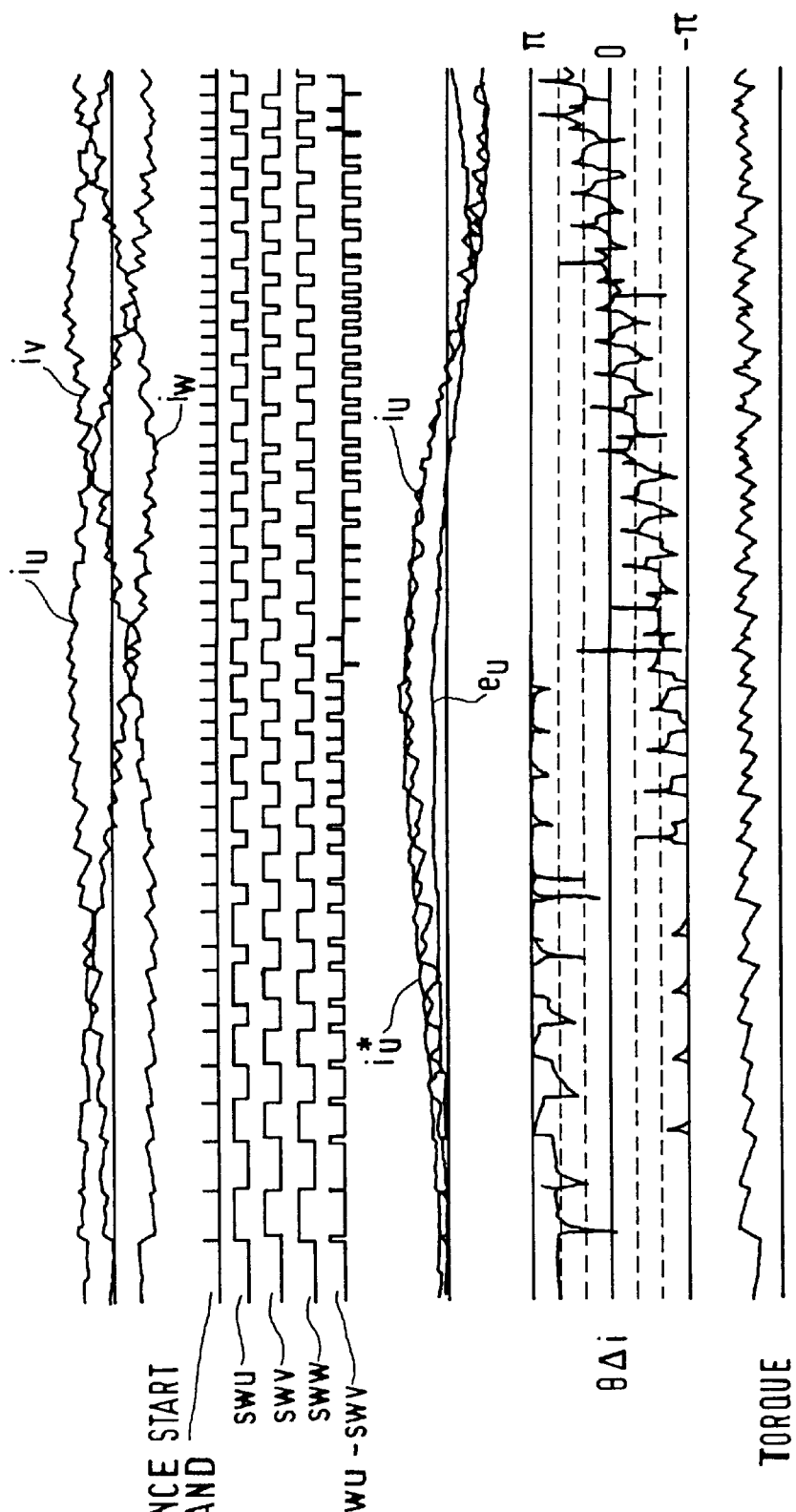
FIG. 32 shows the results of simulation of current control in an induction motor using embodiment 2 of the invention (showing the changes in switching frequency)

FIG. 32 shows waveform simulation for current control using embodiment 2 when the operating frequency of the induction motor was increased in a straight line from zero. The allowable error setting is the same as in FIG. 19.

In FIG. 32, it can be seen that the switching frequency increases with the motor rotation speed. Since the back electromotive force is small at low rotation speeds, the period of zero vector operation becomes longer, and the switching frequency becomes lower. Therefore, according to the embodiments, unlike in conventional hysteresis-band PWM control, the phenomenon of unusual increases in switching frequency does not occur. Although the switching frequency falls at low rotation speeds and the duty of the elements becomes light, large changes in the switching frequency are all the same undesirable because of noise.

Figure 33:
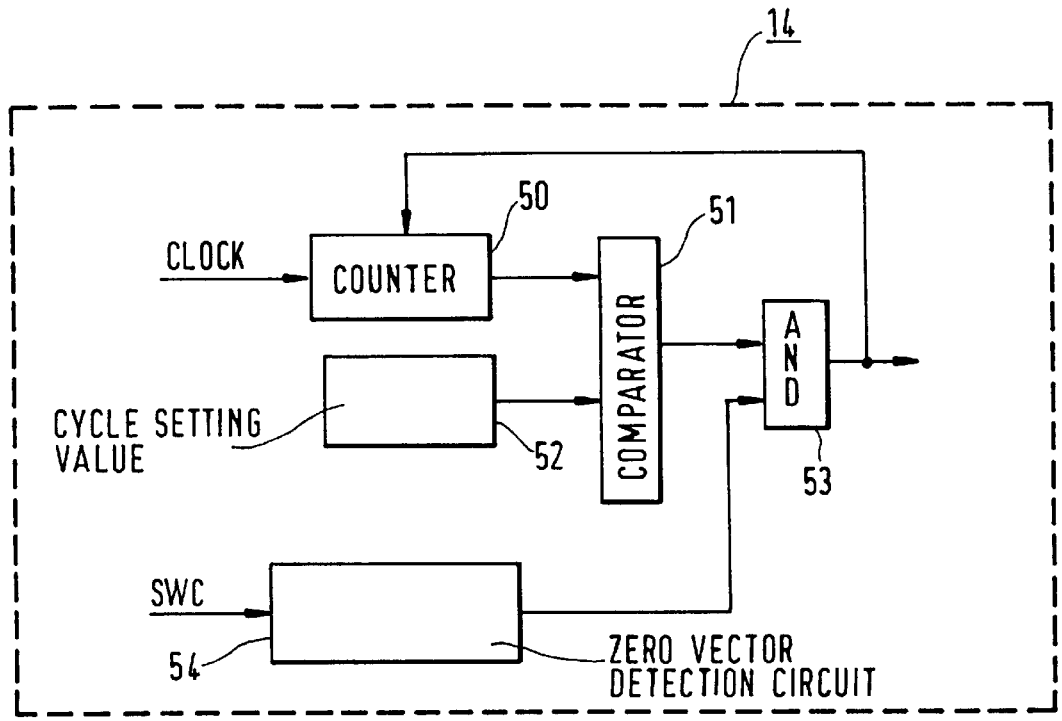
FIG. 33 is a detailed configuration diagram of the sequence start circuit in embodiment 2 of the invention.

Sequence start circuit 14 in FIG. 33 is an example of a sequence start circuit required to perform PWM control at an almost fixed switching frequency. In FIG. 33, 50 is a counter, 51 is a comparator, 52 is the cycle setting value, 53 is an AND circuit, and 54 is a zero vector detection circuit.

Figure 34:
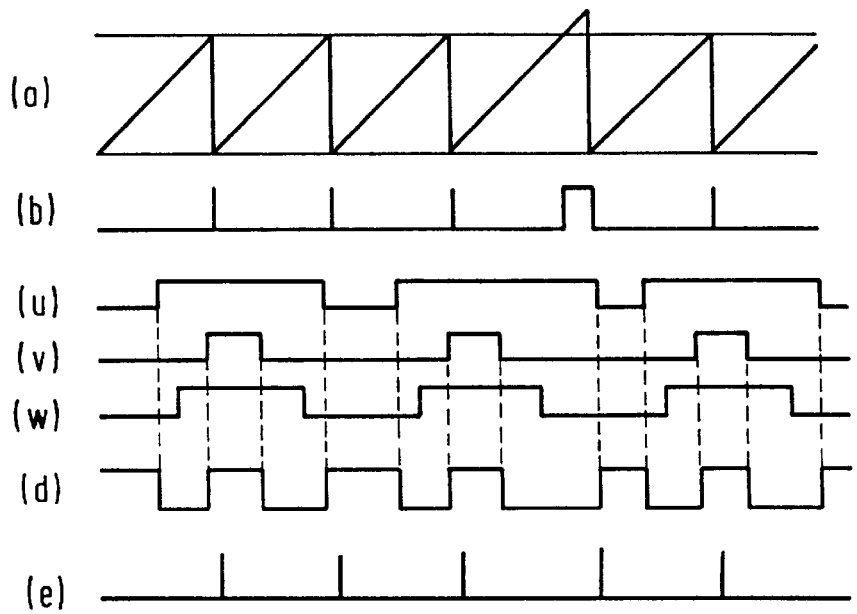
FIG. 34 is a diagram for the operation of the sequence start circuit shown in FIG. 33.

The following is an explanation of the operation of sequence start circuit 14 in FIG. 33 based on the operation explanation diagram in FIG. 34.

A high-speed clock signal from an external clock generator not shown in FIG. 33 is sent to counter 50, which counts the signals and outputs their value. The sawtooth waveform in FIG. 34(*a*) shows the increase in the count value in analog form. Comparator 51 compares the output of counter 50 with cycle setting value 52. The cycle setting value also is shown in FIG. 24(*a*).

If the output of counter 50 is equal to or greater than cycle setting value 52, comparator 51 outputs logical value 1, as shown in FIG. 34(*b*). The comparator output (*b*) is compared in AND circuit 53 with the output of zero vector detector 54. Switching signal swc output from switching sequence logic circuit 13 is input into zero vector detector 54, and if its value is sw(7) or sw(0), logical value 1 will be output.

The structural elements of switching signal swc, that is, the switching signals of each phase, are shown as (*u*), (*v*), and (*w*) in FIG. 34. If signals (*u*), (*v*), and (*w*) are all 0 or all 1, zero vector detector 54 outputs logical value 1, shown as (*d*) in FIG. 34.(*e*) in FIG. 34 is the output of AND circuit 53, which is sent to counter 50 as the count value reset signal.

As a result, sequence start circuit 14 sends a sequence start signal generally at a fixed cycle to switching sequence logic circuit 13. On receiving this start signal, switching sequence logic circuit 13 moves from a zero vector to a nonzero vector, performs one further movement only between nonzero vectors, then finally completes a series of sequences by moving to zero vectors, continuing to output zero vectors until it receives the next sequence start signal. The reason for performing movement between nonzero vectors once only in the switching sequence logic circuit shown in FIG. 21 is that swo, the switching signal output the time before, is a zero vector, and if swc, the switching signal being output, is different from swn, the output of vector selection table 21, the configuration is capable of performing vector movements, even if no sequence start signal is received from outside.

Meanwhile, since sequence start circuit 14 creates a start signal by performing an AND operation on the output of zero vector detection circuit 54 and the output of comparator 51, it does not output the sequence start signal until switching sequence logic circuit 13 outputs a zero vector, that is, until one switching sequence has finished, even if a period longer than the set cycle elapses.

As a result, the switching frequency lags somewhat behind the set cycle, and the frequency fluctuates a little. Although, with the exception of AND circuit 53 and zero vector detection circuit 54, switching start signals are output at precisely fixed cycles, if a start signal is sent before the switching sequence has finished, movement between nonzero vectors will take place, and the switching movement sequence will become disordered. Also, even if a period longer than the set cycle elapses, sequence start circuit 14 will not output the sequence start signal until switching sequence logic circuit 13 outputs a zero vector, that is, until one switching sequence has finished. In this way, irrespective of the setting cycle of sequence start circuit 14, it is possible for the switching sequence logic circuit to output pulses whose width is only that required for the current reference and sudden changes in disturbance, for example, making possible rapid transient response.

Figure 35:
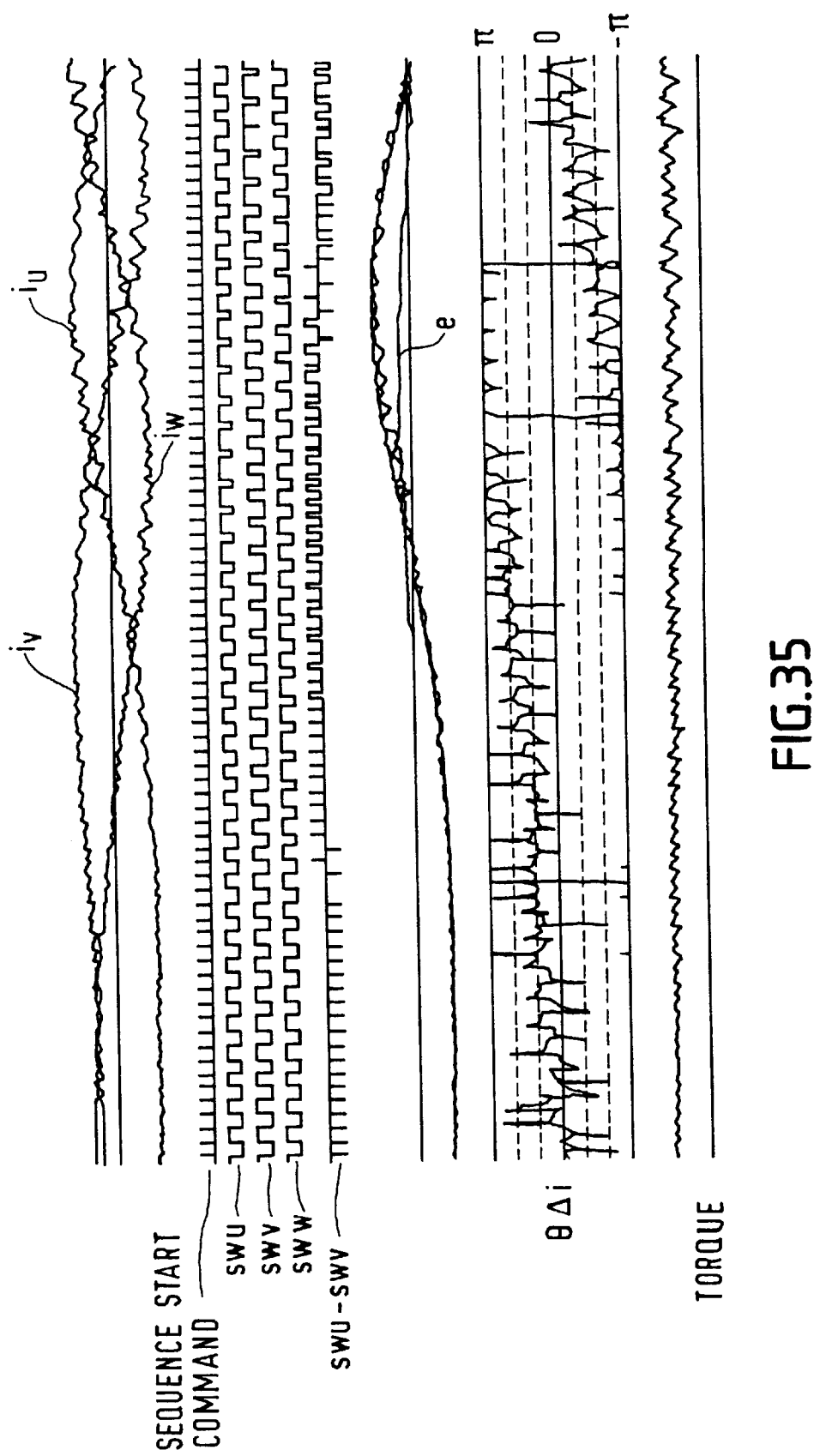
FIG. 35 shows the results of simulation of current control in an induction motor using embodiment 3 of the invention (showing the changes when performed at a fixed switching frequency)

As can be seen from FIG. 34, the switching frequency is the inverse of almost two times the value of setting cycle 52. Waveform simulation for when a motor is operated under the same conditions as in FIG. 32 is shown in FIG. 35. The switching frequency is maintained almost constant.

As described above, using embodiment 3, because fixed-modulation-frequency PWM control is performed in a steady state, it is possible in an inverter using high-speed switching elements not only to prevent the switching frequency from falling into the audible range but also to eliminate changes in harmful noise when using low-speed switching elements. Furthermore, switching loss of the main elements of the inverter can be easily determined, leading to simpler design. Moreover, setting is very simple because the switching frequency is set using the comparison level setting of the comparator, which compares the count value of the cycle measurement counter.

A simulation of waveforms using embodiment 3 (FIG. 35) shows that the current ripple is small when the motor operating frequency is low and that the current ripple increases in line with increasing motor frequency. Even now, asynchronous PWM is still used at low operating frequencies, with control changing over to synchronous PWM as the operating frequency increases.

In fixed-modulation-frequency PWM control, when the motor operating frequency increases, the back electromotive force increases and the current change due to the back electromotive force in the zero-voltage vector output also increases. The phenomenon of current ripple enlargement occurs, while the number of switchings in one cycle of the operating frequency decreases. In the asynchronous mode, since the current waveform changes momentarily, at high rotation speeds, when the back electromotive force disturbance increases and even the possibility of control decreases, current waveform stability deteriorates markedly. For this reason, operation is changed over to synchronous PWM control. In synchronous PWM control, current waveform stability is maintained by repeatedly outputting the same voltage waveform, even though the current ripple becomes larger. However, in conventional methods, since the magnitudes of the fundamental-wave and harmonic-wave components of the voltage change suddenly when changing over from asynchronous PWM control to synchronous PWM control, there remains the problem of large transient currents.

Embodiment 4 is an example in which both asynchronous PWM control using embodiment 3 and fixed-allowable-error PWM control using embodiment 2 are made possible by sending the switching sequence start signal to the switching sequence logic circuit together with the switching sequence start signals in the OR condition of both the sequence start circuit shown in embodiment 3 and the sequence start circuit shown in embodiment 2. At low rotation speeds, fixed-modulation-frequency PWM control like that in embodiment 3 is performed, thereby maintaining the current deviation within the allowable error range. As the rotation speed increases, with fixed-modulation-frequency control, the current deviation increases. When the current deviation is about to exceed the allowable error, PWM control is performed on the basis of embodiment 2.

In embodiment 4, switching control simultaneously involves current control and PWM control, and since the changeover from fixed-modulation-frequency control to fixed-allowable-error control is made by controlling the magnitude of the current deviation, the problem of shock occurring at the time of changeover arises. In fact, by maintaining a rotation speed range in which both outputs are in the OR condition, as until now, the changeover does not suddenly occur at a particular rotation speed.

In simple terms, in embodiment 2 and embodiment 3, although the changeover is performed using a method in which a switching sequence start signal is sent in the OR condition of the output of switching sequence circuit 14, in the rotation speed range in which operation is performed with both outputs in the OR condition, the number of pulses increases. To prevent this, a minor modification must be made to sequence start circuit 14 in embodiment 3. In consideration of this, an example of a sequence start circuit for operation with fixed-allowable-error control in the OR condition is shown in FIG. 36.

Figure 36:
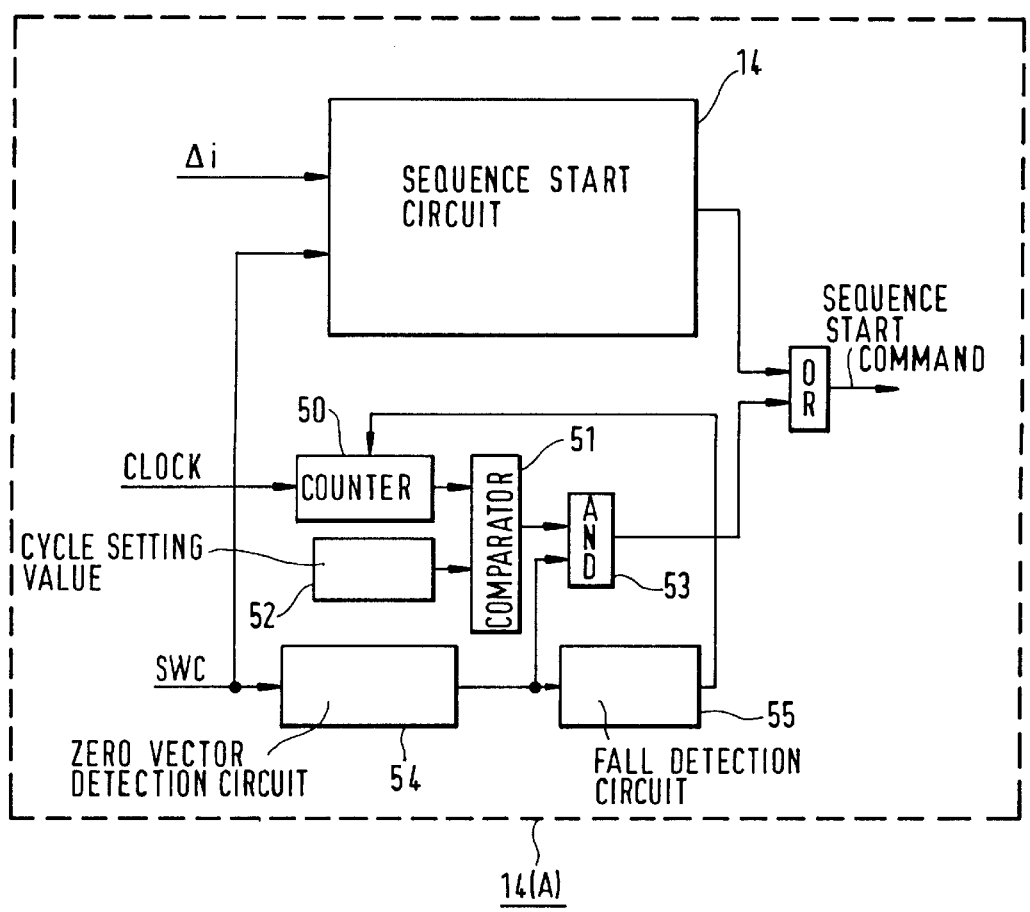
FIG. 36 is a detailed configuration diagram of the sequence start circuit in embodiment 4 of the invention.

Sequence start circuit 14(A) for asynchronous PWM control, shown in FIG. 36, differs from the sequence start circuit shown in FIG. 33 in that fall detection circuit 55 has been added and in that the output of fall detection circuit 55 is sent as a reset signal to counter 50. Fall detection circuit 55 generates a one-shot pulse when the output of zero vector detection circuit 54 changes from 1 to 0. Therefore, since the value of switching signal swc is either sw(0) or sw(7), a one-shot pulse is generated when the value changes to other than these two, resetting the count value of counter 50 to 0. An OR operation is performed by OR circuit 56 on the output signal of AND circuit 53 and the logical sum of sequence start circuit 14, and the resultant signal is sent to switching sequence logic circuit 13.

By configuring a circuit such as sequence start circuit 14(A), switching sequence logic circuit 13 can be made to operate in accordance with the sequence start signal output by sequence start circuit 14 to perform fixed-allowable-error switching control. Even if the switching signal changes from a zero vector to a nonzero vector, the counter will be reset. Therefore, irrespective of whether the sequence start is for fixed-allowable-error control or fixed-modulation-frequency control, the time taken to change from the preceding zero vector to the nonzero vector is measured by counter 50. Therefore, in both types of sequence start, an increase in the number of pulses can be prevented in the rotation speed range in which switching sequence logic circuit 13 operates.

As a result, nearly fixed-modulation-frequency PWM control can be used at low motor rotation speeds, and fixed-allowable-error PWM control can be used at high rotation speeds. Using fixed-allowable-error PWM control, the rotation speed increases, and continuous operation is possible until the square-wave mode is reached.

Figure 37:
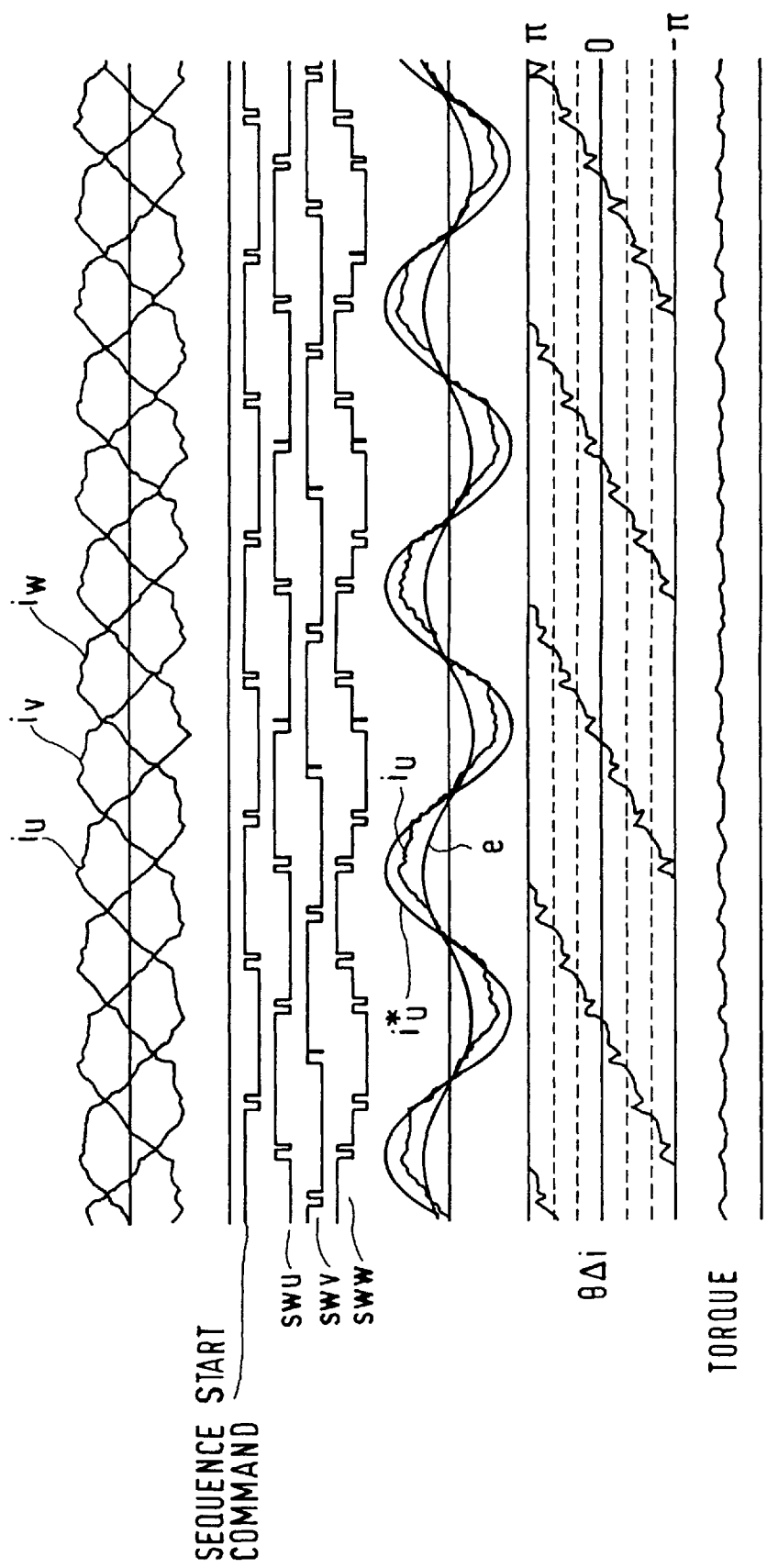
FIG. 37 shows the results of simulation of current control in an induction motor using embodiment 4 of the invention.

FIG. 37 shows simulation of a waveform at a rotation speed just below that at which the operation enters the square-wave mode. The waveform is like that of a synchronous PWM signal. In both embodiment 1 and embodiment 2 of the present invention, this type of waveform can be obtained by reducing the magnitude of the allowable error. Such a waveform can be obtained also in conventional hysteresis-band PWM control by making the hysteresis band smaller. However, in conventional hysteresis-band PWM control, the switching frequency becomes very high at low rotation speeds, so it is difficult to make the hysteresis band small enough to obtain a stable current waveform at rotation speeds close to the square-wave mode.

In embodiment 4 of the present invention, the allowable error setting value can be reduced by changing over to fixed-modulation-frequency control at a low rotation speed and to fixed-allowable-error control at a high rotation speed, enabling a waveform similar to that of synchronous-mode PWM control to be obtained.

At rotation speeds close to the square-wave range such as these, even with the present invention, the actual current flowing in the inverter circuit cannot be controlled so that it is the same as the current reference. Even in the recently much used dq shaft current control+triangle-wave-comparison PWM control, current control in this range is not possible, the reason being that the direct-current voltage of the inverter is insufficient to control the current, so the current can no longer follow the real current. In dq shaft current control+triangle-wave-comparison PWM control, the current control amp becomes saturated in this range, making current control and, of course, pulse width control impossible. In contrast to this, although the current lags far behind the current reference and therefore cannot be controlled to the same level, the present invention wherever possible controls the current by making the deviation smaller. As a result, when the current reference is changed, the current waveform changes in the same way, enabling continuous PWM control up to the square-wave range.

In current control response in the range of rotation speeds at which current control is possible, unlike embodiment 3, embodiment 4 does not have a delay period. This is because, even if fixed-frequency control is performed at low rotation speeds, the sequence start circuit for fixed-allowable-error control operates immediately at times such as at stepped changes of the current reference.7

Therefore, as explained above, in embodiment 4, modulation-frequency-fixed control is performed at low rotation speeds, while fixed-allowable-error control is performed at high rotation speeds, so control is possible over a wide inverter operating range using the same control logic. Fixed-allowable-error control can be used continuously for PWM control up to the square-wave range, while at rotation speeds slightly lower than the square-wave range, a voltage waveform similar to that for synchronous PWM control can be obtained, enabling stable operation in such ranges. It is also possible to move between the fixed-modulation-frequency control range and the fixed-allowable-error range without the least shock. The invention can therefore be used in applications which require a very wide operating frequency range, extending from zero up to the square-wave range, examples of which are desktop calculators and electric vehicles.

The modulation frequency can be controlled also by making the value of the allowable error of the fixed-allowable-error sequence start circuit of the present invention change in accordance with the motor operating conditions. In contrast to conventional hysteresis-band PWM, in the present invention there are no sudden changes in the modulation frequency, which can be easily controlled by using the allowable error setting value.

Although the present invention has so far been proposed as a method of controlling motor loads, it can also be used for other loads. An example of such an application in as an inverter for uninterruptive power supply (UPS) equipment. The inverter output in such equipment has an LC filter, and the back electromotive force in this explanation may be considered to correspond to the capacitor voltage of the filter at the inverter output stage. A problem in UPS equipment is the voltage change due to high-speed load disturbance when the rectifier load is applied, and high-speed current control is desirable as minor-loop voltage control to reduce the voltage distortion factor. The present invention enables very rapid current response and therefore UPS equipment with a small voltage distortion factor.

Accordingly, as described above, the embodiments of the present invention have the following effects.

(1) Very rapid current response equivalent to hysteresis-band PWM control is possible and, moreover, in a steady state, harmonic waves can be reduced by selecting only voltage vectors with a gentle current change.

(2) Rapid current response is possible even when using low-speed switching elements such as GTOs. The high-speed current control enabled by the present invention is directly linked to torque response in such applications as alternating-current variable drives for servomotors and for main rolling mill machines used in steel making and enhances the functions of these machines.

(3) Since the switching sequence logic is executed on the basis of the current deviation vector angle only, different types of PWM control, including fixed-modulation-frequency PWM control and fixed-allowable-error PWM control, can be performed using the same switching sequence logic by changing the configuration of the sequence start circuit.

(4) Since switching control is performed on the basis of the current deviation vector angle and its own switching signal history without the need for back electromotive force information, the invention can be used in motors whose back electromotive force is not known as well as in voltage PWM inverters such as UPS equipment.

(5) In the case of dq shaft current control+triangle-wave-comparison PWM control, there is no need for current control circuit PI gain or various other forms of compensation such as back electromotive force compensation control to eliminate the effect of back electromotive force disturbance, noninteractive control to prevent mutual interference of dq shafts, or dead-time compensation to compensate the PWM distortion due to the on-delay to prevent short-circuit faults in the inverter switching elements.

As described above, without using back electromotive force vector position information, the present invention provides an inverter controller capable of obtaining PWM signals capable of harmonic control as well as rapid current control response and of obtaining PWM signals whose switching frequency does not fluctuate widely.

Obviously, numerous additional modifications and variations of the present invention are possible in light of the above teachings. It is therefore to be understood that within the scope of the appended claims, the invention may be practices otherwise than as specially described herein.

What is claimed as new and desired to be secured by Letters Patent of the United States is:

1. An inverter controller for keeping an output current of an inverter having self-turn-off switching devices to be obedient to a current command, said inverter controller comprising:

a deviation arithmetic circuit for calculating a deviation between said current commands and said output current;

a vector angle arithmetic circuit for calculating a deviation current vector angle on the basis of a deviation from said deviation arithmetic circuit; and a switching sequence logic circuit for generating a switching sequence so that switching signals are selected on the basis of said deviation current vector angle calculated by said vector angle arithmetic circuit and a switching signal being output by said switching sequence logic circuit itself or on the basis of said deviation current vector angle and said switching signal being output by the switching sequence logic circuit itself and said switching signal output previously, said inverter controller controls said self-turn-off switching devices on the basis of said switching signals output by said switching sequence logic circuit.

2. An inverter controller according to claim 1, wherein:

said switching sequence logic circuit for generating a switching sequence which is (1) to make said switching sequence logic circuit select a switching signals whose output voltage vector angle is nearest to the deviation current vector angle in the matter of movement from a switching signal in which an output voltage of said inverter is a zero voltage vector to a switching signal in which an output voltage of said inverter is a nonzero vector, (2) during movement from the switching signal in which the output voltage of the inverter is a nonzero voltage vector, (2-1) to make said switching sequence logic circuit maintain a switching signal being output if said nonzero voltage vector whose angle is nearest to said deviation current vector angle is a nonzero voltage vector being output, (2-2) to make said switching sequence logic circuit select a switching signal which is an adjacent nonzero voltage vector if said nonzero voltage vector whose angle is nearest to said deviation current vector angle is said nonzero voltage vector adjacent to said nonzero voltage vector being output, and (2-3) to make the switching sequence logic circuit select a switching signal which is a zero voltage vector if said nonzero voltage vector whose angle is nearest to said deviation current vector angle is neither a nonzero voltage vector being output nor a nonzero voltage vector adjacent to said nonzero voltage vector being output.

3. An inverter controller according to claim 1, wherein:
said switching sequence logic circuit for generating a switching sequence which is
(1) to make said switching sequence logic circuit select a switching signal which is a nonzero voltage vector whose angle is nearest to the deviation current vector angle from among nonzero voltage vectors which can be moved by switching one phase only of a switching signal being output in the matter of movement from a switching signal in which an output voltage of said inverter is a zero voltage vector to a switching signal in which said output voltage of said inverter is a nonzero voltage vector,
(2) during movement from a switching signal in which said output voltage of said inverter is a nonzero voltage vector,
(2-1) to make said switching sequence logic circuit maintain a switching signal being output if said nonzero voltage vector whose angle is nearest to said deviation current vector angle is a nonzero voltage vector being output,
(2-2) to make said switching sequence logic circuit select a switching signal which is an adjacent nonzero voltage vector if said nonzero voltage vector whose angle is nearest to said deviation current vector angle is a nonzero voltage vector adjacent to said nonzero voltage vector being output, and, if said nonzero voltage vector whose angle is nearest to said deviation current vector angle is neither a nonzero voltage vector being output nor a nonzero voltage vector adjacent to said nonzero voltage vector being output,
(2-3-1) to make said switching sequence logic circuit select a switching signal with all of the phases made negative-side arc-self-turn-off switching devices on if a switching performed in any phase to move from a vector before movement to a nonzero voltage vector being output to a nonzero voltage vector being output is from positive-side self-turn-off switching devices on to negative-side self-turn-off switching devices on, and
(2-3-2) to make said switching sequence logic circuit select a switching signal with all of the phases made positive-side self-turn-off switching devices on if a switching performed in any phase to move from a vector before movement to a nonzero voltage vector being output to a nonzero voltage vector being output is from negative-side self-turn-off switching devices on to positive-side self-turn-off switching devices on.

4. An inverter controller for keeping an output current of an inverter having self-turn-off switching devices to be obedient to a current command, said inverter controller comprising:
a deviation arithmetic circuit for calculating a deviation between said current command and said output current;
a vector angle arithmetic circuit for calculating a deviation current vector angle on the basis of said deviation from said deviation arithmetic circuit;
a switching sequence logic circuit for selecting switching signals on the basis of a deviation current vector angle calculated by said vector angle arithmetic circuit and a switching signal being output by said switching sequence logic circuit itself or on the basis of said deviation current vector angle and the switching signal being output by said switching sequence logic circuit itself and the switching signal output previously and which generates a switching sequence to control the self-turn-off switching devices; and
a sequence start circuit for generating sequence start signals for the switching sequence logic circuit in conditions other than the deviation current vector angle,
said inverter controller controls the self-turn-off switching devices on the basis of said switching signals output by the switching sequence logic circuit.

5. An inverter controller according to claim 4, wherein:
said switching sequence logic circuit for, on receiving a sequence start signal, selecting and outputting switching signals in which an inverter output voltage is a nonzero voltage vector whose angle is nearest to a deviation current vector angle and which, when the deviation current vector angle is nearest to the voltage vector capable of being output which is neither the inverter output voltage vector due to the switching signal being output nor a voltage vector capable of being output which is adjacent to said voltage vector, generates a switching sequence to move to a switching signal whose output voltage vector magnitude has been made zero even if the sequence start signal has not been received;
a sequence start circuit for generating sequence start signals on the basis of the size of the deviation between said inverter output current and a current reference and said switching signal being output,
said inverter controller controls said self-turn-off switching devices on the basis of said switching signals output by said switching sequence logic circuit.

6. An inverter controller according to claim 4, wherein:
said switching sequence logic circuit for, on receiving a sequence start signal while the switching signal whose output voltage is a zero voltage vector is being output,
moving to a switching signal whose output voltage vector angle is nearest to a current deviation vector angle and which is due to a switching signal from among switching signals which can be moved by switching one phase only,
maintaining the switching signal if said output voltage vector angle is nearest to said current deviation vector angle while a switching signal in which the output voltage is a nonzero voltage vector is being output is said output voltage vector due to the switching signal being output,
moving to the switching signal which, only on the condition that a sequence start signal is received or the switching signal being output before moving to the switching signal now being output was a zero-voltage vector, outputs the voltage vector if it is the voltage vector adjacent to the output voltage vector due to the switching signal being output,
moving unconditionally to the switching signal whose output voltage is a zero voltage vector if it is neither the output voltage vector whose angle is nearest to the current deviation vector angle nor the voltage vector adjacent to the output voltage vector due to the switching signal being output,
selecting the switching signal which enables a zero voltage vector in the output voltage with all of the phases made negative-side self-turn-off switching devices on if the switching performed in any phase to move from the vector before movement to the nonzero voltage vector being output at that time to the nonzero voltage vector being output is from the positive-side self-turn-off switching devices on to the negative-side self-turn-off switching devices on, selecting the switching signal which enables a zero voltage vector in the output voltage with all of the phases made positive-side self-turn-off switching devices on if the switching performed in any phase to move from the vector before movement to the nonzero voltage vector being output at that time to the nonzero voltage vector being output is from the negative-side self-turn-off switching devices on to the positive-side self-turn-off switching devices on, and a sequence start circuit for generating sequence start signals on the basis of the size of the deviation between an inverter output current and a current reference and said switching signal being output, said inverter controller controls said self-turn-off switching devices on the basis of the switching signals output by said switching sequence logic circuit.

7. An inverter controller according to claim 4, wherein:

said switching sequence logic circuit for, on receiving a sequence start signal while the switching signal whose output voltage is a zero voltage vector is being output, moving to the switching signal whose output voltage vector angle is nearest to the current deviation vector angle and which is due to a switching signal from among said switching signals which can be moved by switching one phase only, maintaining the switching signal if the output voltage vector angle is nearest to the current deviation vector angle while the switching signal in which the output voltage is the nonzero voltage vector is being output is the output voltage vector due to the switching signal being output, moving to the switching signal which, only on the condition that a sequence start signal is received or the switching signal being output before moving to the switching signal now being output was a zero-voltage vector, outputs the voltage vector if it is the voltage vector adjacent to the output voltage vector due to the switching signal being output, moving unconditionally to the switching signal whose output voltage is a zero voltage vector if it is neither the output voltage vector whose angle is nearest to the current deviation vector angle nor the voltage vector adjacent to the output voltage vector due to the switching signal being output, selecting the switching signal which enables a zero voltage vector in the output voltage with all of the phases made negative-side self-turn-off switching devices on if the switching performed in any phase to move from the vector before movement to the nonzero voltage vector being output at that time to the nonzero voltage vector being output is from the positive-side self-turn-off switching devices on to the negative-side self-turn-off switching devices on, selecting the switching signal which enables a zero voltage vector in the output voltage with all of the phases made positive-side self-turn-off switching devices on if the switching performed in any phase to move from the vector before movement to the nonzero voltage vector being output at that time to the nonzero voltage vector being output is from the negative-side self-turn-off switching devices on to the positive-side self-turn-off switching devices on; and a sequence start circuit for measuring the period from when the switching signal output by said switching sequence logic circuit changes from a zero voltage vector into a nonzero voltage vector and for outputing a sequence start signal from when this period exceeds a prescribed period until the next switching signal has changed from a zero voltage vector into a nonzero voltage vector, said inverter controller controls the self-turn-off switching devices on the basis of said switching signals output by said switching sequence logic circuit.

8. An inverter controller according to claim 4, wherein:

a switching sequence logic circuit for, on receiving a sequence start signal while the switching signal whose output voltage is a zero voltage vector is being output, moving to the switching signal whose output voltage vector angle is nearest to the current deviation vector angle and which is due to a switching signal from among the switching signals which can be moved by switching one phase only, maintaining said switching signal if said output voltage vector angle is nearest to the current deviation vector angle while the switching signal in which the output voltage is the nonzero voltage vector is being output is the output voltage vector due to the switching signal being output, moving to the switching signal which, only on the condition that a sequence start signal is received or the switching signal being output before moving to the switching signal now being output was a zero-voltage vector, outputs the voltage vector if it is the voltage vector adjacent to the output voltage vector due to the switching signal being output, moving unconditionally to the switching signal whose output voltage is a zero voltage vector if it is neither the output voltage vector whose angle is nearest to the current deviation vector angle nor the voltage vector adjacent to the output voltage vector due to the switching signal being output, selecting the switching signal which enables a zero voltage vector in the output voltage with all of the phases made negative-side self-turn-off switching devices on if the switching performed in any phase to move from the vector before movement to the nonzero voltage vector being output at that time to the nonzero voltage vector being output is from the positive-side self-turn-off switching devices on to the negative-side self-turn-off switching devices on, selecting the switching signal which enables a zero voltage vector in the output voltage with all of the phases made positive-side self-turn-off switching devices on if the switching performed in any phase to move from the vector before movement to the nonzero voltage vector being output at that time to the nonzero voltage vector being output is from the negative-side self-turn-off switching devices on to the positive-side self-turn-off switching devices on, a first sequence start circuit for generating a sequence start signal on the basis of the magnitude of the deviation between said inverter output current and a current reference and the switching signal being output; and a second sequence start circuit for measuring the period from when the switching signal output by said switching sequence logic circuit changes from a zero voltage vector into a nonzero voltage vector, for outputting a sequence start signal from when this period exceeds a prescribed period until the next switching signal has changed from a zero voltage vector into a nonzero voltage vector, by sending a sequence start signal to the switching sequence logic circuit when the sequence start signal output by said second sequence start circuit or said second sequence start circuit is in the OR condition, said inverter controller controls the self-turn-off switching devices on the basis of said switching signals output by said switching sequence logic circuit.

\* \* \* \* \*